US005583676A

United States Patent [19]
Akiyama et al.

[11] Patent Number: 5,583,676
[45] Date of Patent: Dec. 10, 1996

[54] SPATIAL LIGHT MODULATOR, METHOD OF PRODUCTION THEREOF AND PROJECTION-TYPE DISPLAY

[75] Inventors: Koji Akiyama, Neyagawa; Akifumi Ogiwara, Hirakata; Hisahito Ogawa, Ikoma-gun, all of Japan

[73] Assignee: Matsushita Electric Industrial Co., Ltd., Osaka, Japan

[21] Appl. No.: 300,336

[22] Filed: Sep. 2, 1994

[30] Foreign Application Priority Data

Sep. 2, 1993 [JP] Japan .................... 5-218722

[51] Int. Cl.$^6$ .................... G02F 1/135; G02F 1/1333
[52] U.S. Cl. ................................. 349/28; 349/110
[58] Field of Search ................... 359/72, 45, 67; 430/66, 62

[56] References Cited

U.S. PATENT DOCUMENTS

| | | | |
|---|---|---|---|
| 4,012,119 | 3/1977 | Adams et al. | 359/71 |
| 5,031,082 | 7/1991 | Bierend | 362/233 |
| 5,056,897 | 10/1991 | Akiyama | 359/72 |
| 5,132,814 | 7/1992 | Ohkouchi et al. | 359/51 |
| 5,142,391 | 8/1992 | Fujiwara | 359/67 |
| 5,155,609 | 10/1992 | Konno et al. | 359/71 |
| 5,233,450 | 8/1993 | Hatano | 359/72 |
| 5,305,129 | 4/1994 | Fujiwara | 359/67 |
| 5,329,390 | 7/1994 | Fujiwara | 359/67 |
| 5,384,649 | 1/1995 | Takemoto et al. | 359/67 |
| 5,416,621 | 5/1995 | Tanaka | 359/72 |
| 5,453,860 | 9/1995 | Akiyama | 359/72 |

FOREIGN PATENT DOCUMENTS

| | | |
|---|---|---|
| 0494666 | 7/1992 | European Pat. Off. . |
| 0503570 | 9/1992 | European Pat. Off. . |
| 0547581 | 6/1993 | European Pat. Off. . |
| 0552492 | 7/1993 | European Pat. Off. . |
| 58-34435 | 2/1983 | Japan . |
| 2-110920 | 4/1990 | Japan . |
| 5-19289 | 1/1993 | Japan . |

OTHER PUBLICATIONS

Partial European Search Report dated Sep. 7, 1995.
Extended Abstracts of the 1992 International Conference on Solid State Devices and Materials, Tsukuba, 1992, pp. 252–254, "Hydrogenated Amorphous Silicon Carbide Photoreceptor for Photoaddressed Spatial Light Modulator", Koji Akiyama et al.

*Primary Examiner*—William L. Sikes
*Assistant Examiner*—Trep H. Nguyen
*Attorney, Agent, or Firm*—Fish & Richardson P.C.

[57] ABSTRACT

A spatial light modulator including a pair of transparent insulating substrates each having a transparent conducting electrode, the substrates forming a top layer and a bottom layer, a photoconductive layer, a liquid crystal layer and a reflection layer being present between the top and bottom layers, wherein the photoconductive layer comprises a first amorphous semiconductor layer and a second amorphous semiconductor layer disposed in order on the bottom layer, and the first amorphous semiconductor layer and the second amorphous semiconductor layer have different refractive indices from each other.

28 Claims, 10 Drawing Sheets

SPATIAL LIGHT MODULATOR, METHOD OF PRODUCTION THEREOF AND PROJECTION-TYPE DISPLAY

FIELD OF THE INVENTION

This invention relates to a spatial light modulator for use in optical computers or projection-type displays, a method of producing the modulator, and a projection-type display using the modulator.

BACKGROUND OF THE INVENTION

Optically addressed spatial light modulators using liquid crystal layers (hereinafter, referred to as spatial light modulator) basically includes a photoconductive layer, a liquid crystal layer which changes light transmittance upon application of electric field and a pair of transparent conductive electrodes which sandwich the photoconductive layer and the liquid crystal layer between the electrodes.

This modulator is driven by applying voltage to both electrodes from outside. Light irradiated toward the photoconductive layer leads to a change in electrical resistance in the photoconductive layer and a change in the voltage applied to the liquid crystal layer. Accordingly, a read light passing through the liquid crystal layer is modulated according to the variation in voltage. Such operation enables many functions including light threshold processing, wavelength conversion, incoherent/coherent conversion, image memory and the like. Therefore, spatial light modulators are considered an important device for optical processing. Further, these devices serve as optical amplifiers when a read light with a large optical intensity is injected from the opposite direction of light for writing, and the memory is read-out in reflection mode. Accordingly, these devices are used as a general-purpose device including a projection-type display.

Projection processes of conventional projection-type displays include the following three types: (1) one using the above-mentioned optically addressed spatial light modulator, (2) one using bright three-tube cathod ray tube (CRT), and (3) last one which projects an active matrix liquid crystal light valve with a bright light source.

In the process using CRT, images are displayed on three bright CRTs of R, G and B with an opposite angle of 5 to 7 inches, the images are projected on a screen by three projection lenses and synthesized to obtain a color image. This process has problems that the projector is heavy, or a bright display decreases resolution.

In the process using an active matrix liquid crystal light valve, images are displayed on a liquid crystal panel which is formed of three liquid crystal panels or color filters of Red, Green and Blue integrated in one body. The displayed images are read-out by a bright back light source such as a metal halide lamp or a halogen lamp, and are projected on a screen. In contrast to CRT method, this method has the advantages of enabling to downsize the projector. However, the method still has a problem. To obtain a high resolution image, the size of pixels in a liquid crystal panel must be small. The ratio of light-shielding region (a transistor component for driving an active matrix) to the size of the pixels increases with decreasing rate of pixel hole area, thus darkening images. Consequently, as long as projection-type displays using CRT or active matrix liquid crystal light valve were used, the resolution would always be in inverse proportion to the brightness.

On the contrary, when optically addressed spatial light modulators are used, images are input in a photoconductive layer by CRT. The images are read-out from the liquid crystal layer side by a bright light source, and they are projected on a screen through a projection lens. This process can work with a downsized projector to provide a bright image plane with high resolution. Therefore, this new process solves the problems with brightness and resolution, from which conventional displays suffered.

The best conventional spatial light modulator is a device including a thin layer of amorphous silicon hydride (hereinafter, abbreviated as a-Si:H) as a photoconductive layer and a liquid crystal layer formed of ferroelectric liquid crystal (hereinafter, abbreviated as FLC). Such device exhibits the highest sensitivity and the most rapid response, and further is easy to use with a small operation voltage.

FIG. 10 is a sectional view of this device. The device comprises photoconductive layer 1001, reflector 1002, FLC liquid crystal layer 1003, a pair of transparent electrodes 1004 and 1005, and a pair of glass substrates 1006 and 1007 sandwiching those layers, reflector and electrodes therebetween. Photoconductive layer 1001 is a pin diode formed of an a-Si:H thin film. Furthermore, a projection-type display equipped with such a modulator and CRT as an image writing means is disclosed in M. Bone et al., SID Digest, pp. 254–256.

The a-Si:H thin film for a photoconductive layer is formed by plasma chemical vapor deposition (chemical vapor deposition is abbreviated as CVD). Optical conductivities of the a-Si:H thin film strongly depends on the substrate temperature at the film forming step. In general, the substrate temperature at the film forming step is preferably set at approximately 200° to 300° C. Temperatures above 300° C., or below 180° C. are not preferred because the density of dangling bonds in the film inappropriately increases. In particular, the increase in the density of dangling bonds considerably decreases optical conductivity since the dangling bonds trap or recombine carriers. A photoconductive layer in the spatial light modulator produces light-excited carriers upon light irradiation and transports the carriers toward the liquid crystal layer. The photoconductive layer therefore plays an important role in determining sensitivity and response rate of the spatial light modulator. For this reason, the photoconductive layer needs high optical conductivity. To obtain such high conductivity, the a-Si:H films were formed at the substrate temperature of 200° to 300° C. in the plasma CVD or the reactive sputtering.

With projection-type displays using a CRT as a write light source, a CRT with an opposite angle of at least 7 inches was used to write an image in the spatial light modulator. The light emitting wavelength of the CRT was at least 600 nm.

The condition where light is irradiated under reverse bias in conventional photoconductive layer 1001 in FIG. 10 is described below.

Though most of the light irradiated is absorbed in the p/i layer, part of the rest is absorbed in the n layer, or returns to the i layer after passing through the n layer and being reflected back from reflector 1002. No depletion layer extends in the n layer of low-resistance under reverse bias. As a result, electron-hole pairs produced by optical absorption in the n layer do not drift in an electric field. The electron-hole pairs do not work as photocurrent to run in photoconductive layer 1001. Light returned to the i layer from reflector 1002 extends photocarriers horizontally, decreasing resolution of written images. The larger the photocurrent runs in the photoconductive layer with respect to incident light with a constant intensity, the smaller the necessary optical intensity of light for switching the liquid crystal layer is. Sensitivity of the spatial light modulator is thus improved. Consequently, the photoconductive layer for use in conventional spatial light modulators does not utilize write light effectively, decreasing sensitivity of the modulators.

An a-Si:H film for a photoconductive layer is formed by plasma CVD as follows. A substrate in a vacuum chamber is heated up to 200° to 300° C. On the substrate, an a-Si:H film having a given thickness is formed and cooled down to around room temperature. In this process, substrate heating and cooling steps take two hours or more in total. The required time is as long as necessary for forming a film, or more. To shorten the heating time, the heating rate is increased simply by increasing the amount of current to a heater. However, a shortened heating time causes a problem that a modulator cannot output constant images free of irregularity.

On an industrial scale using a great number of substrates at a time, heat is not evenly conveyed to them in a short time, causing unevenness in the substrate temperature and irregularity in sensitivity of the photoconductive layer. To obtain a constant substrate temperature, at least one hour is necessary to heat substrates even if the heating rate is increased. To shorten the cooling time, water cooling seems effective; however such rapid cooling causes film stress, causing peeling or cracking of films. Consequently, substrates after forming films is so far required to be cooled gradually for about one hour. Even if the time for forming an a-Si:H film was shortened, the whole processes to produce a device was dependent on the heating and cooling time. Therefore, devices were not effectively mass-produced.

Conventional projection-type displays using CRT utilize a long-wave light having a wavelength of 600 nm or more to write images. The coefficient of absorptivity of a-Si:H with respect to this wavelength is so small that a photoconductive layer needs a thickness of at least 2 μm in order to absorb the whole light. The photoconductive layer in spatial light modulators using FLC as a liquid crystal layer usually has a thickness of 2 to 3 μm. The thickness has no problem in absorbing write light. However, the electron mobility of a-Si:H is two orders of magnitude larger than the hole mobility, and the trap center of holes is deeper in light energy than that of electrons. Consequently, the response in photocurrent running through the photoconductive layer was late. The displays had a problem that afterimage or burning occurred in the output image. Furthermore, when a CRT which emits light against a short wave light of 600 nm or less is used, the p-type a-Si:H layer has a large light absorption and needs a large amount of light to write images. Nevertheless, output of images with a high brightness using a small CRT considerably decreases resolution and contrast. Therefore, CRT was required to be large for much light, causing enlargement of projectors.

SUMMARY OF THE INVENTION

The invention provides a spatial light modulator which outputs images with high sensitivity and high resolution, a method of the modulator in which a photoconductive layer is formed in a short time, and a small projection-type display using the modulator.

The spatial light modulator of the invention comprises a pair of transparent insulating substrates each having a transparent conducting electrode, the substrates forming a top layer and a bottom layer, and a photoconductive layer, a liquid crystal layer and a reflection layer are disposed between the top and bottom layers wherein the photoconductive layer comprises a first amorphous semiconductor layer and a second amorphous semiconductor layer disposed in order on the bottom layer, and the refractive indices of the first and second layers are different from each other.

It is preferable in the modulator that the photoconductive layer further comprises a third amorphous semiconductor layer between the transparent conducting electrode of the bottom layer and the first amorphous semiconductor layer and the third amorphous semiconductor layer has a refractive index smaller than the first amorphous semiconductor layer.

It is also preferable that the first amorphous semiconductor layer has a refractive index of 3.2 to 4.5.

It is also preferable that the second amorphous semiconductor layer has a refractive index between 1.4 and 3.2.

Furthermore, it is preferable that the photoconductive layer has rectification.

It is preferable that the first amorphous semiconductor layer comprises an alloy containing silicon as a main ingredient.

It is further preferable that the first amorphous semiconductor layer comprises at least one element selected from the group consisting of hydrogen, a halogen and oxygen. The term "main ingredient" means to an ingredient of at least 50 atomic percent. The same definition is hereinafter used.

It is also preferable that the first amorphous semiconductor layer comprises at least one alloy selected from the group consisting of amorphous silicon hydride, amorphous germanium hydride, amorphous silicon germanium hydride and hydrogenized amorphous germanium carbide. In this case, it is further preferable that the first amorphous semiconductor layer comprises at least one p-type dopant selected from the group consisting of B, Al and Ga.

In addition, it is preferable that the second amorphous semiconductor layer comprises an alloy containing germanium as a main ingredient.

It is also preferable that the second amorphous semiconductor layer comprises at least one alloy selected from the group consisting of amorphous silicon hydride, hydrogenized amorphous germanium nitride, hydrogenized amorphous silicon germanium nitride, hydrogenized amorphous silicon carbide, hydrogenized amorphous germanium carbide, hydrogenized amorphous silicon nitride, hydrogenized amorphous silicon oxide and amorphous carbon hydride. In this case, it is further preferable that the second amorphous semiconductor layer comprises at least one n-type dopant selected from the group consisting of P, As, Sb and Se. It is further preferable that the second amorphous semiconductor layer comprising hydrogenized amorphous silicon carbide has a carbon content of 10 to 40 atom %.

It is also preferable that the third amorphous semiconductor layer has a thickness of 1 to 300 nm.

Furthermore, it is preferable that the third amorphous semiconductor layer comprises amorphous silicon carbon containing 100 to 10000 ppm of at least one p-type dopant selected from the group consisting of B, Al, Ga and In.

It is also preferable that the photoconductive layer has a thickness of 0.5 to 10 μm.

It is also preferable that the reflection layer comprises at least one metal selected from the group consisting of Al, Ag, Mo, Ni, Cr, Mg and Ti.

It is preferable that the reflection layer is formed in islands, and one of the island-shaped reflection layers corresponds to one pixel. In this case, it is further preferable that a part of the second amorphous semiconductor layer between two adjacent island-shaped reflection layers is removed, and an optical absorption layer exists in the space where the second amorphous semiconductor layer was removed. It is still further preferable that a part of the first amorphous semiconductor layer under the removed layer is also removed, and an optical absorption layer exists in the space where the first amorphous semiconductor layer was removed. It is also preferable that the remaining part of the first amorphous semiconductor layer has a thickness of 0.01 to 1 µm. It is also preferable that the optical absorption layer comprises at least one material selected from the group consisting of an organic polymer dispersed with carbon particle, an organic polymer containing black pigment, an organic polymer containing black dye, amorphous silicon carbide, amorphous germanium hydride and amorphous germanium nitride. It is also preferable that the a light-shielding layer exists under the optical absorption layer, and the light-shielding layer comprises at least one metal selected from the group consisting of Al, Ag, Mo, Ni, Cr and Mg. It is also preferable that the optical absorption layer is coated with an electrically insulating layer selected from the group consisting of an inorganic insulating layer and an organic insulating layer.

The method of producing a spatial light modulator of the invention comprises the steps of introducing a gas to a pressure-reducible vacuum chamber and adjusting the pressure in the chamber, producing discharge in the chamber to form a plasma, forming the photoconductive layer on the transparent insulating substrate, forming the reflector, and forming the liquid crystal layer over the reflector, wherein the transparent insulating substrate is kept at a temperature of from 10° to 180° C. after the step of forming the photoconductive layer.

It is preferable in the method that the reflector comprises island-shaped reflectors formed on a plane identical to the top interface of the photoconductive layer and that the method further comprises the steps of applying an organic thin film to the island-shaped reflectors, and exposing the reflectors to a heat treatment at a temperature more than 180° C. after the step of forming the island-shaped reflectors.

It is also preferable that the reflector is a dielectric reflector formed at a temperature more than 180° C.

It is also preferable that the substrate is kept at a temperature of 10° to 180° C. while the photoconductive layer is being formed.

It is also preferable that the insulating substrate kept at a temperature of 180° C. or more is gradually cooled while the photoconductive layer is being formed on the insulating substrate, and the insulating substrate is kept at a temperature of 180° C. or less when the step of forming the photoconductive layer is completed.

It is also preferable that a part of the photoconductive layer comprises a hydrogen containing silicon carbide.

It is also preferable that the carbon content in the hydrogen containing silicon carbide is 10 to 40 atomic %.

The projection-type display of the invention comprises a spatial light modulator including at least a pair of transparent insulating substrates each having a transparent conducting electrode forming a top layer and a bottom layer, a photoconductive layer and a liquid crystal layer which are present between the top and bottom layers, an AC power source for driving the spatial light modulator, the power source being connected with the conducting electrode, an image input means for outputting an image by light having a wavelength of 400 to 600 nm, an image forming means for forming an image from the image being output from the image input means on the photoconductive layer, and a light source and a projection lens for reading the image being output from the spatial light modulator, wherein the photoconductive layer comprises a first amorphous semiconductor layer containing silicon and carbon as main ingredients and a second amorphous semiconductor layer containing silicon as a main ingredient, the first and second layers being laminated in order between the top and bottom layers, and the photoconductive layer has rectification. The invention provides a projection-type display which is free of afterimages or burning and is capable of be downsized.

It is also preferable that the first amorphous semiconductor layer has a thickness smaller than the second amorphous semiconductor layer. In this case, light absorption is effective, improving the sensitivity of the modulator.

It is also preferable that the first amorphous semiconductor layer has a thickness of 5 to 18 nm.

According to the invention, a write light is reflected at the interface between the layer having the larger refractive index and the layer having the smaller refractive index. When the layer having the larger refractive index is formed of a material having a large electrical resistivity, such as i-type a-Si:H, the light is reflected into the i layer having a depletion layer. The reflected light is then absorbed in the i layer, producing photocarriers. These photocarriers are applied with such a high electric field by the depletion layer in the i layer that these carriers drift along the electric field and work as a photocurrent for running in the photoconductive layer. When the light is reflected at the interface, the optical path length is short, and the extension of light in the i layer is reduced compared to the conventional devices. Therefore, the invention provides a spatial light modulator with high sensitivity and high resolution.

The method of the invention forms a photoconductive layer in a short time without lengthy heating and cooling time. The reason is explained below.

The properties of a-Si:H, such as stress, band gap or photo conductivity, are dependent on the content of hydrogen in the a-Si:H film and the condition of hydrogen bond in SiH, $SiH_2$, or $(SiH_2)_n$ where n is a number of 2 or more. The substrate temperature in forming films by which the hydrogen bond is affected apparently changes the properties of a-Si:H. When an a-Si:H film is formed at a low substrate temperature of 180° C. or less, the content of hydrogen in the film increases and the compression stress of the film is reduced. As a result, adhesion of the film to the substrate is improved. However, the density of the film is small and the optical conductivity is considerably reduced. On the other hand, when an a-Si:H film is formed at a high substrate temperature of 200° C. or more, the thermal behaviour of hydrogen radicals on the surface of a depositing film influences the hydrogen bond condition. At a low substrate temperature of 180° C. or less, the quality of the film depends on the condition of the radicals for forming a film, more than the substrate temperature. For forming an a-Si:H film in conventional spatial light modulator, the differences in the substrate temperatures needed to be within ±5° C. due to a high substrate temperature of 200° to 300° C.

On the contrary, with the methods of the invention the differences in the substrate temperatures can be even within ±20° C. when a low substrate temperature of 180° C. is used. Consequently, a shortened heating time for the substrate causes no problem for quality of the film. Even if cooling time is shortened by water cooling, the film does not peel off the substrate because the film firmly adheres to the substrate.

The inventors found that even an a-Si:H film having only low optical conductivity formed at a low substrate temperature is improved in a new method enough for providing a satisfactory photoconductive layer and an excellent spatial light modulator. The method was heating up to a temperature of 180° to 300° C. in forming a liquid crystal oriented film from polyimide or polyvinyl alcohol, or heating up to a similar temperature in forming a dielectric reflector by sputtering or electron beam deposition. In other words, the method of the invention provides a mass-producible spatial light modulator having a desired properties by forming a photoconductive layer at a low substrate temperature, and conducting a particular process for remarkably reducing the heating and cooling time in forming the photoconductive layer.

The i layer in a photoconductive layer for use in a spatial light modulator produces photo carriers and effectively transports them toward the reflector. Therefore, a small loss of light in the p layer in passing the p layer and striking the i layer is preferred. A p layer using a conventional a-Si:H absorbs a short wave light of 600 nm or less well even though the layer is thin. Light-beam addressing using a CRT which emits light at a wavelength of 600 nm or less therefore needed a very large amount of light.

In contrast, a p layer formed of amorphous silicon carbide hydride (hereinafter, abbreviated as a-$Si_{1-x}C_x$:H wherein x is a number above 0 and below 1), whose band gap is wider than that of a-Si:H, enables light to arrive at the i layer without absorption in the p layer with respect to a short wave light of 600 nm or less. The i-type a-Si:H absorbs light with 600 nm or less and produces photocarriers. The i layer transmits only electrons. Holes having a late mobility are transferred to a thin p layer. The photocurrent running through the photoconductive layer is hardly influenced by the holes. No deep trap with respect to the holes exists in the p layer. The photocurrent rapidly responds. Therefore, a projection-type display equipped with a spatial light modulator using a-$Si_{1-x}C_x$:H as a p layer in the photoconductive layer enables writing images with even a small amount of light having a short wavelength and to provide images free of afterimage or burning. Deterioration in resolution and contrast of a light source for high bright images is decreased. Good quality images with high resolution and high contrast are written to a spatial light modulator. The output images of the modulator is also improved even if the photoconductive layer only has an area at least one-fifth of a maximum area of an image which the image input means outputs. A small CRT can sufficiently write images in the modulator at a wavelength of 600 nm or less. Therefore, the projector can be downsized.

DETAILED DESCRIPTION OF THE INVENTION

The invention will hereinafter be described in detail with reference to Examples and the drawings.

Figure 1:
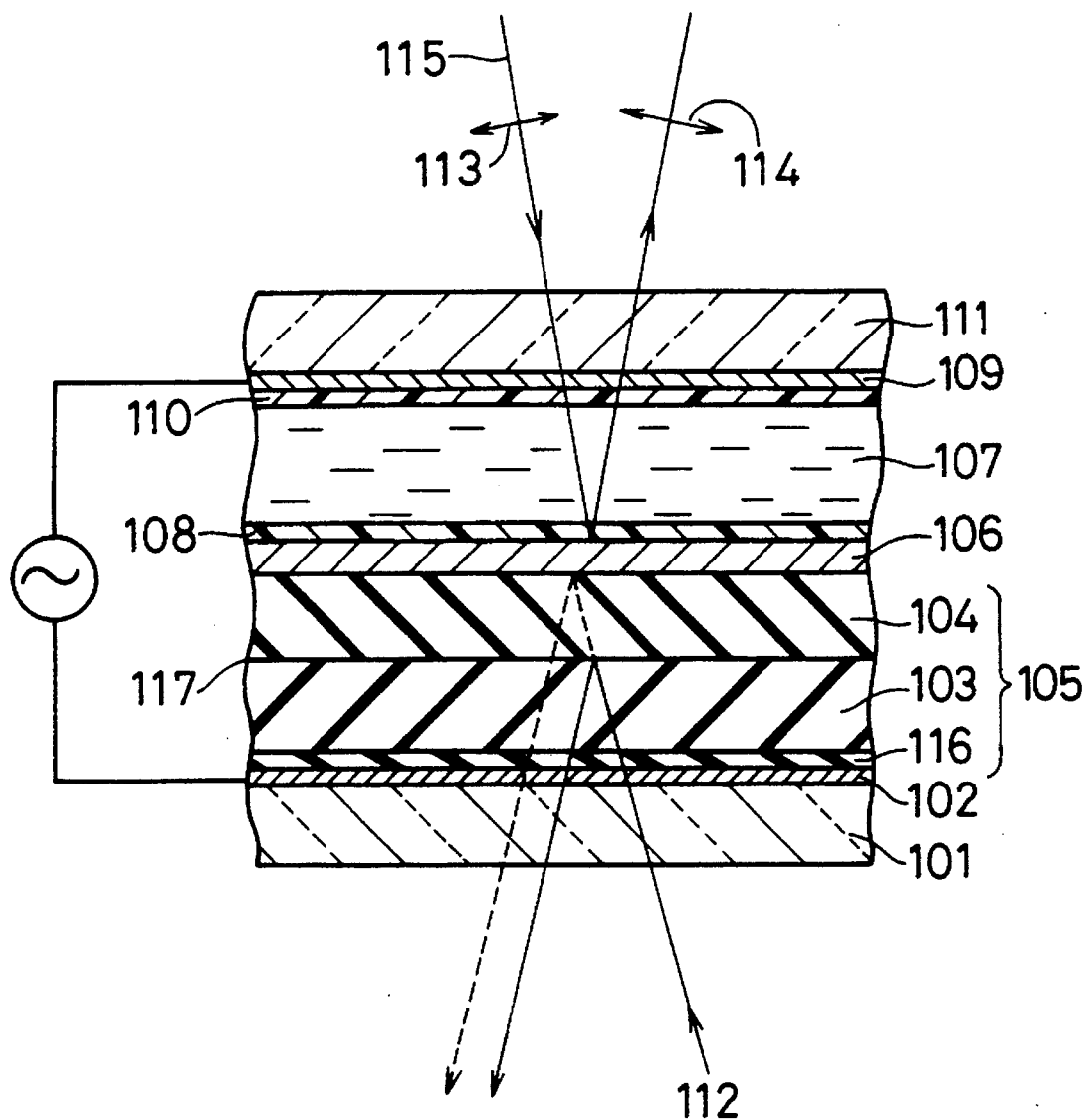
FIG. 1 is a sectional view of a spatial light modulator of one preferred embodiment.

FIG. 1 shows a spatial light modulator of one preferred embodiment. The modulator comprises transparent insulating substrates 101 and 111; transparent conductive electrodes 102 and 109; photoconductive layer 105 consisting of larger-refractive-index layer 103, smaller-refractive-index layers 104 and 116; reflection layer 106; liquid crystal layer 107; aligned films 108 and 110. Reference numerals 112 designates write light; 113 polarizer; 114 analyzer; 115 read light; and 117 interface.

Substrates 101 and 111 are formed of, for example, glass, quartz or sapphire. Electrodes 102 and 109 are formed of, for example, conducting oxides such as indium tin oxide (ITO), ZnO or $SnO_2$.

The modulator is driven by applying voltages to electrodes 102 and 109. When photoconductive layer 105 is irradiated with write light 112, the voltage to liquid crystal 107 corresponding to a site receiving light 112 is increased. Orientation of molecules in liquid crystal 107 changes depending on the increase in the applied voltage. The change in orientation can be detected as catoptric light from reflection layer 106, using an optical system including polarizer 113 and analyzer 114 by incidence of read light 115 from the opposite direction of write light 112. A polarization beam spritter can be used instead of polarizer 113 and analyzer 114.

Examples of materials for liquid crystal layer 107 include nematic liquid crystal, supertwisted nematic liquid crystal, ferroelectric liquid crystal, polymer dispersed liquid crystal and the like. Ferroelectric liquid crystal exhibiting rapid response memory function is especially suitable. The use of ferroelectric liquid crystal enables to thin liquid crystal layer 107 and photoconductive layer 105, leading to a smaller electrical impedance. Ferroelectric liquid crystal is also suitable in threshold process with respect to input light, because permeability of the liquid crystal has a steep threshold property to voltage. The use of polymer dispersed liquid crystal makes polarizer 113, analyzer 114, oriented films 108 and 110. Accordingly, output light can be bright, and the device and the optical system can be simplified. In the cases of using liquid crystal materials other than polymer dispersed liquid crystal liquid crystal layer 107 is sealed with resin, and a spacer (not shown in FIG. 1) to adjust the thickness can be mixed to liquid crystal layer 107. The spacer can usually be formed of bead of alumina or quartz, or glass fiber powder. This spacer can be mixed to the resin sealing liquid crystal layer 107. Oriented films 108 and 110 are formed of $SiO_x$ oblique deposition film or rubbed polymer thin film such as polyimide or polyvinyl alcohol.

Photoconductive layer 105 is preferably formed of a material which is made into a thin and wide film at relatively low temperatures of 400° C. or below. Larger-refractive-index layer 103 needs a function to efficiently generate photocarriers upon incidence of write light 112 and transport them to liquid crystal layer. Larger-refractive-index layer 103 is thus formed of materials having photoconductivities to visible light. Examples of such materials include amorphous semiconductor hydrides such as a-Si:H (refractive index: 3.4), amorphous germanium hydride (referred to as a-Ge:H, refractive index: 4.5) a-$Si_{1-x}C_x$:H (refractive index: 3.0), amorphous silicon germanium hydride (referred to as a-$Si_{1-x}Ge_x$:H refractive index: 3.7) or hydrogenated amorphous-germanium carbide (referred to as a-$Ge_{1-x}C_x$:H refractive index: 3.2–3.6) Halogen atoms such as F or Cl, together with a hydrogen atom, can be added to the above amorphous semiconductor hydrides to effectively reduce dangling bonds serving as carrier traps. Further, a small amount of oxygen atom, for example, 0.1 to 10 atom %, can be mixed.

On the other hand, smaller-refractive-index layer 104 is formed of the same materials for larger-refractive-index layer 103; however, the materials should have an increased hydrogen content. When larger-refractive-index layer 103 is formed of a-$Si_{1-x}C_x$:H or a-$Ge_{1-x}C_x$:H, smaller-refractive-index layer 104 can be formed of the same materials having not only the increased hydrogen content but also an increased carbon content. Specific examples of the combination of materials for larger-refractive-index layer 103 and smaller-refractive-index layer 104 are described below. The abbreviation a-$Ge_{1-x}N_x$:H represents hydrogenated amorphous germanium nitride whose refractive index is 2.7. The abbreviation a-$Si_{1-x-y}Ge_xN_y$:H represents hydrogenated amorphous silicon-germanium nitride whose refractive index is 1.4–3.2. In all the abbreviations, each of x and y is above zero and below one, and the numbers x for layer 103 and layer 104 are the same or different.

| layer 103 | layer 104 |
|---|---|
| a-Si:H | a-$Ge_{1-x}N_x$:H |
| a-Si:H | a-$Si_{1-x}C_x$:H |
| a-$Si_{1-x}Ge_x$:H | a-$Ge_{1-x}N_x$:H |
| a-$Si_{1-x}Ge_x$:H | a-$Si_{1-x}C_x$:H |
| a-Si:H | a-$Ge_{1-x}N_x$:H |
| a-$Si_{1-x}Ge_x$:H | a-$Ge_{1-x}C_x$:H |
| a-Si:H | a-$Si_{1-x}N_x$:H |
| a-$Si_{1-x}Ge_x$:H | a-$Si_{1-x}N_x$:H |
| a-Si:H | a-$Si_{1-x}O_x$:H |
| a-$Si_{1-x}Ge_x$:H | a-$Si_{1-x}O_x$:H |
| a-Si:H | a-C:H |
| a-$Si_{1-x}Ge_x$:H | a-C:H |
| a-Si:H | a-$Si_{1-x-y}Ge_xN_y$:H |
| a-$Si_{1-x}Ge_x$:H | a-$Si_{1-x-y}Ge_xN_y$:H |

The layer 104 using the above materials is formed in plasma CVD method consequently after the layer 103 using a-Si:H or a-$Si_{1-x}Ge_x$:H is formed. The layers 103 and 104 are readily formed at a lower cost than conventional layered films of photoconductive layer (a-Si:H) and photoabsorption layer (CdTe). Of the materials, a-$Ge_{1-x}N_x$:H and a-$Si_{1-x-y}Ge_x$ Y $N_y$:H are especially preferable in a diode to pass forwarding current, because they have a low resistance of $10^8$ Ω cm or less even in an undoped condition. The layer of a-$Ge_{1-x}N_x$:H can contain oxygen at most 20 atom % atom as long as energy gap is not affected. In the case of a-$Si_{1-x-y}Ge_xN_y$:H, oxygen is at most 10 atom % to Si and Ge.

As shown in FIG. 1, write light 112 is reflected at interface 117 of the layer 103 and the layer 104. When the layer 103 is of i-type a-SiH, write light 112 is reflected to i-type a-SiH layer 103, and reflected write light 112 is absorbed in i-type a-SiH layer 103 to generate photocarriers. The photocarriers are drifted in accordance with the electric field applied to the layer 103, and becomes photocurrent for running through photoconductive layer 105. Write light 112 reflected at interface 117 of the layer 103 and the layer 104 has a shorter optical path length than light (shown in FIG. 1 as broken line) conventionally reflected at interface of the layer 105 and reflector 106. Extension of light in i-type layer gets smaller than conventional devices. Therefore, a spatial light modulator with high resolution and sensitivities is provided.

To provide layer 105 with rectification, layer 105 may have p/i, i/n and p/i/n structure therein. Here, the i layer is an undoped layer. Specifically, the n layer is layer 104 formed of one of the above materials including a-Si:H, a-Ge:H, a-$Si_{1-x}C_x$:H, a-$Si_{1-x}Ge_x$:H, a-$Ge_{1-x}C_x$:H, which is added with n-type impurities such as P, As, Sb or Se. Larger-refractive-index layer 103 is used as p/i structure or i layer. To form the p layer, p-type impurities, such as B, Al or Ga, are added to layer 103. To form p/i structure, p layer is formed on the electrode-side surface i-type layer 103, or alternatively, as shown in FIG. 1, another p-type smaller-refractive-index layer 116 is sandwiched between electrode 102 and layer 103.

In particular, when layer 116 is put between electrode 102 and layer 103, write light 112 is firmly confined in layer 103, improving sensitivity of the device. Such smaller-refractive-index layer 116 between electrode 102 and layer 103 is formed of a p-type layer of a-$Si_{1-x}C_x$:H wherein x is above zero and below 0.4 having a thickness of 1.0 to 300 nm, preferably 5.0 to 30 nm, which is added with 100 to 10000 ppm of p-type dopants such as B, Al, Ga or In. Photoconductive layer 105 having rectification enables effective generation and transportation of photocarriers with respect to incidence of write light 112 and to erase images written in liquid crystal layer 107 by applying reverse bias. The thickness of photoconductive layer 105 is usually 0.5 to 10 μm, though it depends on the liquid crystal layer 107.

Figure 3:
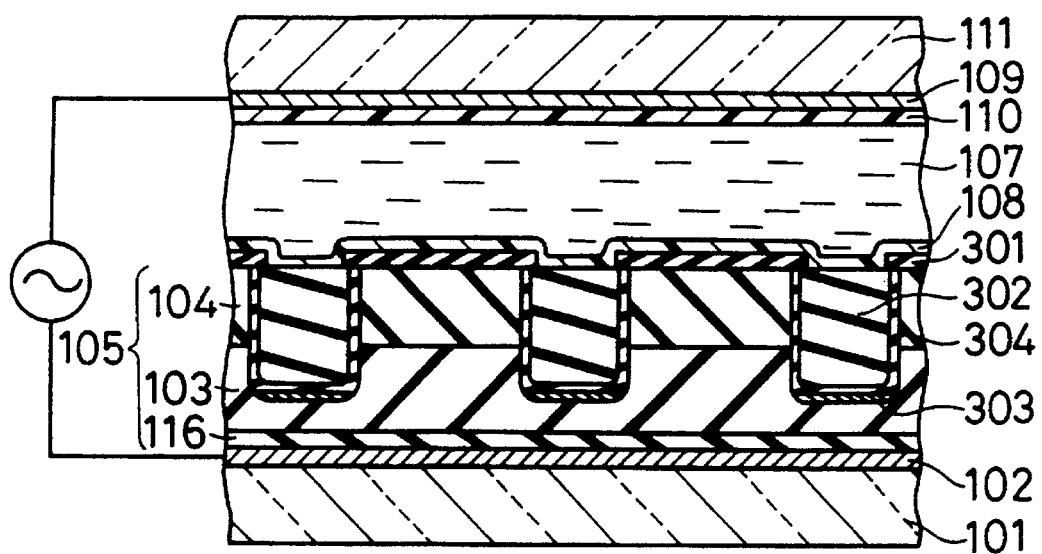
FIG. 3 is a sectional view of a spatial light modulator of another preferred embodiment.

Reflection layer 106 is formed of layered dielectric reflector, which is formed by alternately depositing layers having a large dielectric constant, for example, of $TaO_2$ or Si, and layers having a small dielectric constant, for example, of MgF or $SiO_2$. In another way, as shown in FIG. 3, reflector 301 is formed of metal thin film of Al, Ag, Mo, Ni, Cr, Mg or Ti shaped in islands and distributed in two-dimensional matrix structure or mosaic structure. FIG. 3 is a sectional view of a spatial light modulator of one preferred embodiment. As shown in FIG. 3, island-shaped reflectors 301 can have any form. Reflectors 301 have to separate from each other, because each reflector can exhibit a different potential and cause potential differences, enabling to produce images. Each of reflectors 301 corresponds to one pixel of an output image. Layer 104 between reflectors 301 have to be removed by etching for preventing carriers from diffusing horizontally and improving resolution of the device.

Further, not only layer 104, but also layer 103 between reflectors 301 is removed for preventing intensive write light 115 from striking layer 103 from a gap between reflectors 301. Such striking causes liquid crystal layer 107 to operate in error. The depth of grooves is preferably the same as the thickness of photoconductive layer 105. Photoconductive layer 105 can have a final thickness of 1 μm or less, preferably 0.5 μm or less, which is enough to transmit visible light without absorbing. In grooves, photoabsorption layer 302 is formed of materials for absorbing visible light, for example, a polymer dispersed with carbon particles, a polymer containing black pigment or black dye, or inorganic thin films of a-C:H, a-Ge:H or a-$Ge_{1-x}N_x$:H. Photoabsorption layer 302 absorbs write light 115 leaking from a gap between reflectors 301. For perfectly shielding write light 115, as shown in FIG. 3, metal light-shielding layers 303 of Al, Ag, Mo, Ni, Cr or Mg can be formed on the bottom of grooves. Further, for complete insulation between reflectors 301, insulating layers 304 can be formed on inner face of grooves using insulating materials including inorganic insulators, such as $SiO_x$, $SiN_x$, $SiC_x$, $GeO_x$, $GeN_x$, $GeC_x$, $AlO_x$, $AlN_x$, $BC_x$, $BN_x$, and polymer insulators such as polyimide poly(vinyl alcohol), polycarbonate, poly-p-xylene, poly(ethylene terephthalate), polypropylene, poly(vinyl chloride), poly(vinylidene chloride), polystyrene, polytetrafluoroethylene, polychlorotrifluoroethylene, poly(vinylidene fluoride), a copolymer of hexafluoro propylene and tetrafluoro ethylene, a copolymer of trifluoroethylene and vinylidene fluoride, poly(1-butene), poly(vinyl butyral) or polyurethane.

Figure 2:
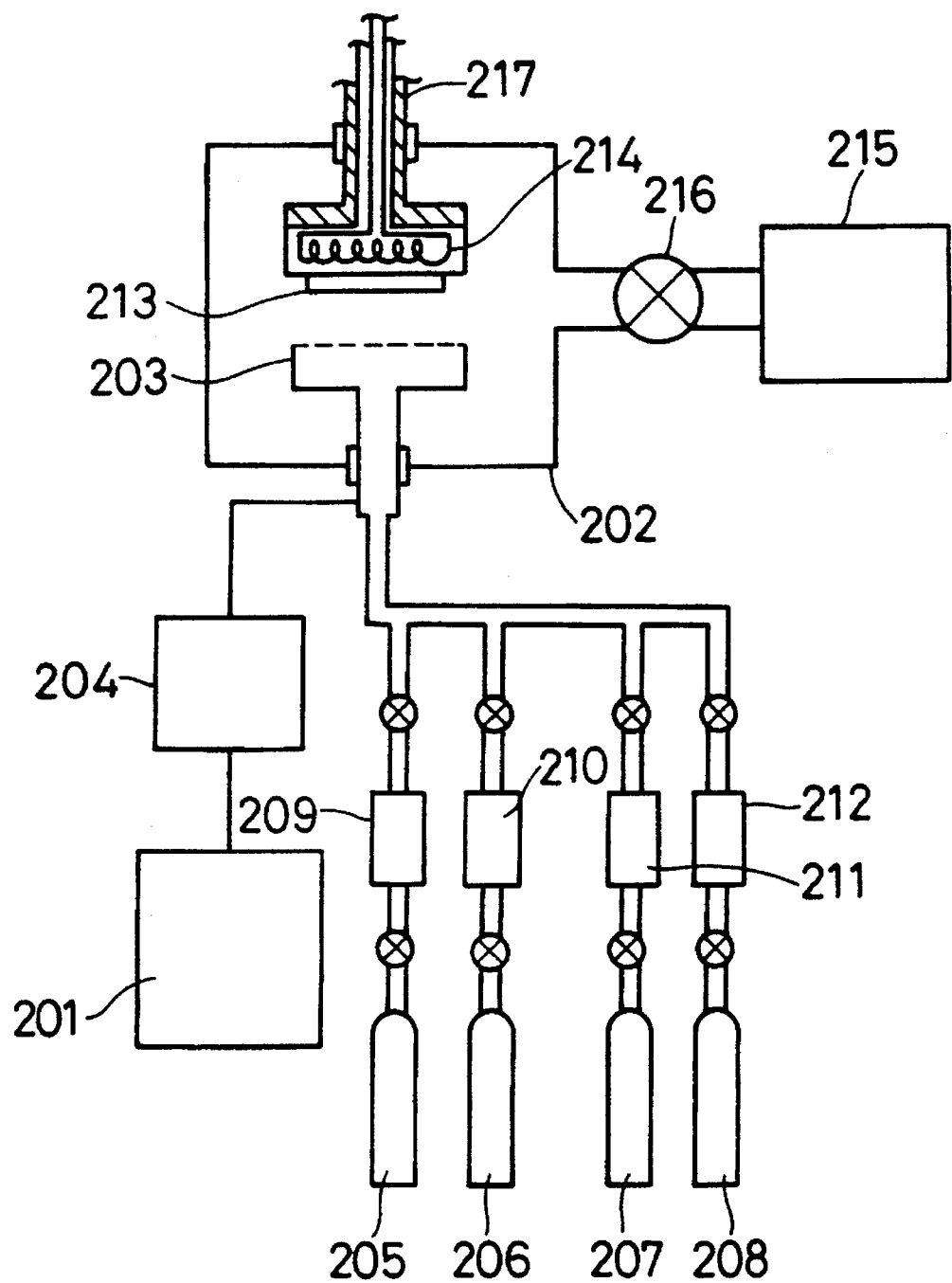
FIG. 2 is a schematic illustration of a plasma CVD apparatus for use in forming the modulators of the preferred embodiments.

Photoconductive layer 105 is formed using a plasma CVD apparatus shown in FIG. 2. The apparatus includes power source 201, vacuum chamber 202, electrode 203, matching circuit 204, gas cylinders 205 through 208, gas-flow controllers 209 through 212, heater 214, vacuum pump 215, valve 216 and water-cooler 217. Power source 201 is a direct current power source, a 1 kHz to 100 MHz radiofrequency-power source or a 1 GHz or more microwave power source. Power source 201 is connected with electrode 203 inside of vacuum chamber 202 through matching circuit 204. With a direct current power source, circuit 204 is unnecessary. Electrode 203 has many pores. Gases from gas cylinders 205 to 208 whose rate is adjusted by controllers 209 to 212 are introduced to vacuum chamber 202 through those pores. The number of gas cylinders and the corresponding gas systems can be increased or decreased dependently of the kind of films for forming. Substrate 213 on which photoconductive layer 105 is formed is heated up to a given temperature on heater 214. The number of vacuum chamber can also be increased according to the number of deposition to form an accumlative photoconductive layer. The apparatus can of course have more chambers to store substrates.

The procedure for forming films will be explained.

A material gas, a dilution gas, and a dopant gas if necessary, are introduced to highly evacuated vacuum chamber 202 at a given flow rate. The pressure of those gases are adjusted by vacuum pump 215 and valve 216 to a predetermined value. Electric field is applied to electrode 203 and substrate 213 to generate plasma for forming a photoconductive layer 105 having a certain thickness on substrate 213.

Material gases for forming an a-Si:H photoconductive layer 105 needs to contain hydrogen atoms for terminate a dangling bond; Examples of those gases include $SiH_4$, $Si_2H_6$, $Si_3H_8$, $Si_4H_{10}$, $SiH_{4-n}F_n$, $SiH_{4-n}Cl_n$ wherein n is a number of 1, 2 or 3. These gases are used singly or in any combination. Further, these gases can be used in combination with at least one gas of $SiF_4$, $SiF_6$ and $SiCl_4$.

For forming an a-$Si_{1-x}C_x$:H film the above silicon compound , gases are used in combination with a carbon hydrogen gas, such as $CH_4$, $C_2H_6$, $C_3H_8$, $C_4H_{10}$, $C_2H_4$, $C_3H_6$, $C_4H_8$, $C_2H_2$, $C_3H_4$, $C_4H_6$ or $C_6H_6$; an alkyl halide gas, such as $CH_3F$, $CH_3Cl$, $CH_3Br$, $CH_3I$, $C_2H_5Cl$, $C_2H_5Br$ or $C_2H_5I$; an allyl halide gas, such as $C_3H_5F$, $C_3H_5Cl$ or $C_3H_5Br$; a FREON ("FREON" is a trademark of dupont), such as $CClF_3$, $CF_4$, $CHF_3$, $C_2F_6$ or $C_3F_8$; and a benzene fluoride, such as $C_6H_{6-m}F$ wherein m is a number between 1 and 6. Alternatively, a gas of $(CH_3)_4Si$ is used singly or in any combination with the above gases.

For forming an a-$Si_{1-x}Ge_x$:H film the above silicon compound , gases are used in combination with gases including $GeH_4$, $Ge_2H_6$, $Ge_3H_8$, $GeF_4$, $GeCl_4$, $GeBr_4$, $GeI_4$, $GeF_2$, $GeCl_2$, $GeBr_2$, $GeI_2$, $GeHF_3$, $GeH_2F_2$, $GeH_3F$, $GeHCl_3$, $GeH_2Cl_2$, $GeH_3Cl$, $GeHBr_3$, $GeH_2Br_2$, $GeH_3Br$, $GeHI_3$, $GeH_2I_2$ and $GeH_3I$.

For forming an a-$Ge_{1-x}N_x$:H film the above germanium compound gases are used in combination with nitrogen compound gases including $N_2$, $NH_3$, $H_2NNH_2$, $HN_3$, $NH_4N_3$, $F_3N$ and $F_4N_2$.

For forming an a-$Si_{1-x-y}Ge_xN_y$:H film, the above silicon compound gases and germanium compound gases are used in combination with the above nitrogen compound gases.

Examples of the dilution gases for diluting the material gases include $H_2$, He, Ne, Ar, Kr or Xe.

For n-type impurities such as P, As, Sb or Se to change electrical conductivity of the films, the above material gases and dilution gases are used in combination with gases including $PH_3$, $PF_3$, $PF_5$, $PCl_2F$, $PCl_2F_3$, $PCl_3$, $PBr_3$, $AsH_3$, $AsF_3$, $AsF_5$, $AsCl_3$, $AsBr_3$, $SbH_3$, $Sb_3$, $SbCl_3$ and $H_2Se$.

For p-type impurities such as B, Al, Ga or In to change electrical conductivity of the films, the above material gases and dilution gases are used in combination with gases including $B_2H_6$, $BF_3$, $BCl_3$, $BBr_3$, $(CH_3)_3Al$, $(C_2H_5)_3Al$, $(iC_4H_9)_3Al$, $(CH_3)_3In$, $(CH_3)_3Ga$, $(C_2H_5)_3In$ and $(C_2H_5)_3Ga$.

Specific examples of the preferred embodiments will be described in detail.

EXAMPLE 1

As shown in FIG. 1, an ITO film having a thickness of 0.05 to 0.2 μm as transparent electrode 102 was formed on glass substrate 101 by sputtering. The film and electrode were set in a plasma CVD apparatus shown in FIG. 2. Vacuum chamber 202 was evacuated to $1\times10^{-6}$ Torr or less, and heated by heater 214 up to 280° C. He-diluted $B_2H_6$ having a concentration of 10 ppm (1 ppm=$1\times10^{-6}$) at a rate of 400 sccm, $SiH_4$ (1 sscm) and $C_2H_2$ (0.2 sccm) were altogether introduced to vacuum chamber 202 in which the pressure was then adjusted to 0.8 Torr. A high radiofrequency-power (30 W) having a frequency of 13.56 MHz was applied to electrode 203 to produce discharge for forming a p-type a-$Si_{1-x}C_x$:H layer having a thickness of 5.0 to 18.0 nm as smaller-refractive-index layer 116. $H_2$ (100 sccm) and $SiH_4$ (40 sscm) were introduced to highly evacuated vacuum chamber 202.

An i-type undoped a-Si:H layer having a thickness of 1.0 to 1.8 μm was similarly formed as larger-refractive-index layer 103 under 0.8 Torr at a radiofrequency-power of 15 W. Afterwards, vacuum chamber 202 was evacuated once again. To form smaller-refractive-index layer 104, $N_2$ (160 sccm) and $GeH_4$ (1 sccm) were introduced to vacuum chamber 202 in which the pressure was then adjusted to 0.5 Torr, and an undoped a-$Ge_{1-x}N_x$:H layer having a thickness of 0.3 to 1 μm was formed under 0.5 Torr at a radiofrequency-power of 20 W to complete photoconductive layer 105. Further, layered dielectric reflector 106 was formed by alternately depositing Si and $SiO_2$ by sputtering, and polyimide oriented film 108, which was oriented by rubbing, was layered thereon. The polyimide used here was an oligo phenylene sulfide-polyimide which the inventors independently developed, represented by Formula (1):

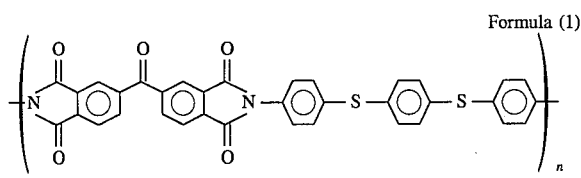

Formula (1)

Ferroelectric crystal layer 107 having a thickness of 0.8 to 1.3 μm was put between polyimide aligned film 108 and glass substrate 111 on which ITO transparent conductive electrode 109 and another polyimide aligned film 110 were layered. The ferroelectric crystal layer used was a product of Chisso Co. Ltd., (code: CS-1029). A spatial light modulator No. 1 was thus completed.

On the other hand, a spatial light modulator No. 2 was also produced by forming a smaller-refractive-index layer 104 from n-type a-Si:H, instead of the above undoped a-Ge$_{1-x}$N$_x$:H, using H$_2$-diluted PH$_3$ having a concentration of 100 ppm at a rate of 50 to 100 sccm and SiH$_4$ (5 to 20 sscm).

Figure 5A:
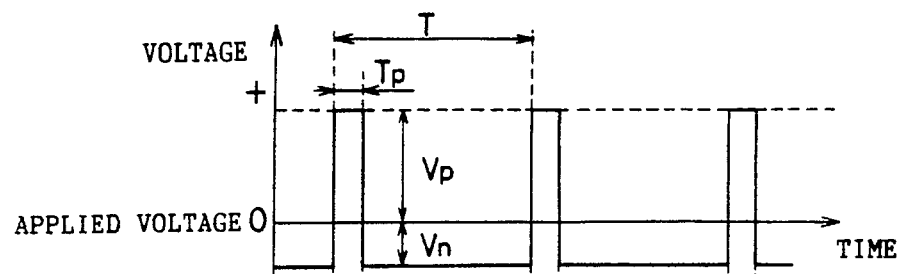
FIG. 5 is a graph showing a relation over time among voltage waveform, write light and output light in one preferred embodiment.
Figure 5B:
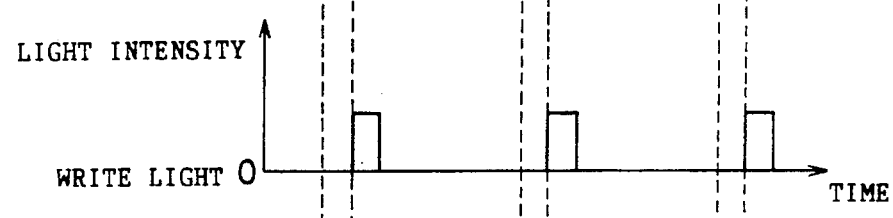
Figure 5C:
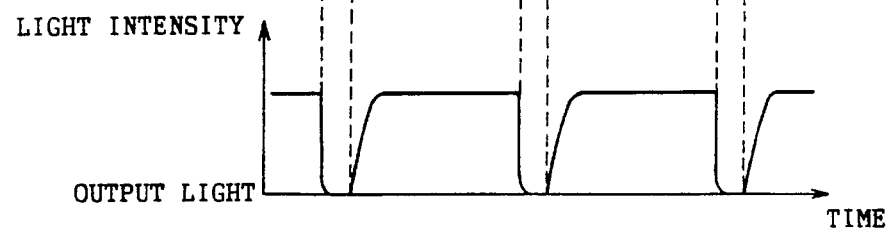

An AC voltage waveform as shown in FIG. 5 was applied to both transparent conductive electrodes 102 and 109 of the modulators Nos. 1 and 2 to examine behaviour of the modulators. White light as write light 112 and He-Ne laser of 633 nm as reading-out light 115 were used. The condition of the waveform used was that V$_p$ was 15 V, V$_n$ was −1, a ratio of T$_p$:T was 1:11, and T ranged from 1 to 16 ms.

The behaviour of the device is now briefly explained with reference to FIG. 3. Applied voltage was set so that transparent conductive electrode 102 be positive. Writing light 112 was irradiated at application of a negative pulse every time photoconductive layer 105 was reversely biased. Such irradiation increased voltages applied to liquid crystal layer 107, the liquid crystal switched from off-state to on-state, outputting output light of reading-out light 115. Then, every time positive pulse is applied so that photoconductive layer 105 is forward biased, liquid crystal layer 107 is switched to off-state, independently of irradiation of write light 112.

Under the condition, the device No. 1 exhibited photosensitivities of 50 to 80 μW/cm$^2$ rise time of 30 to 50 μs, resolution of 50 to 70 lp (line pairs)/mm (modulation transfer function: 50%). On the other hand, the device No. 2 exhibited photosensitivities of 90 to 120 μW/cm$^2$ rise time of 30 to 50 μs, resolution of 40 to 60 lp/mm (modulation transfer function: 50%).

Figure 6:
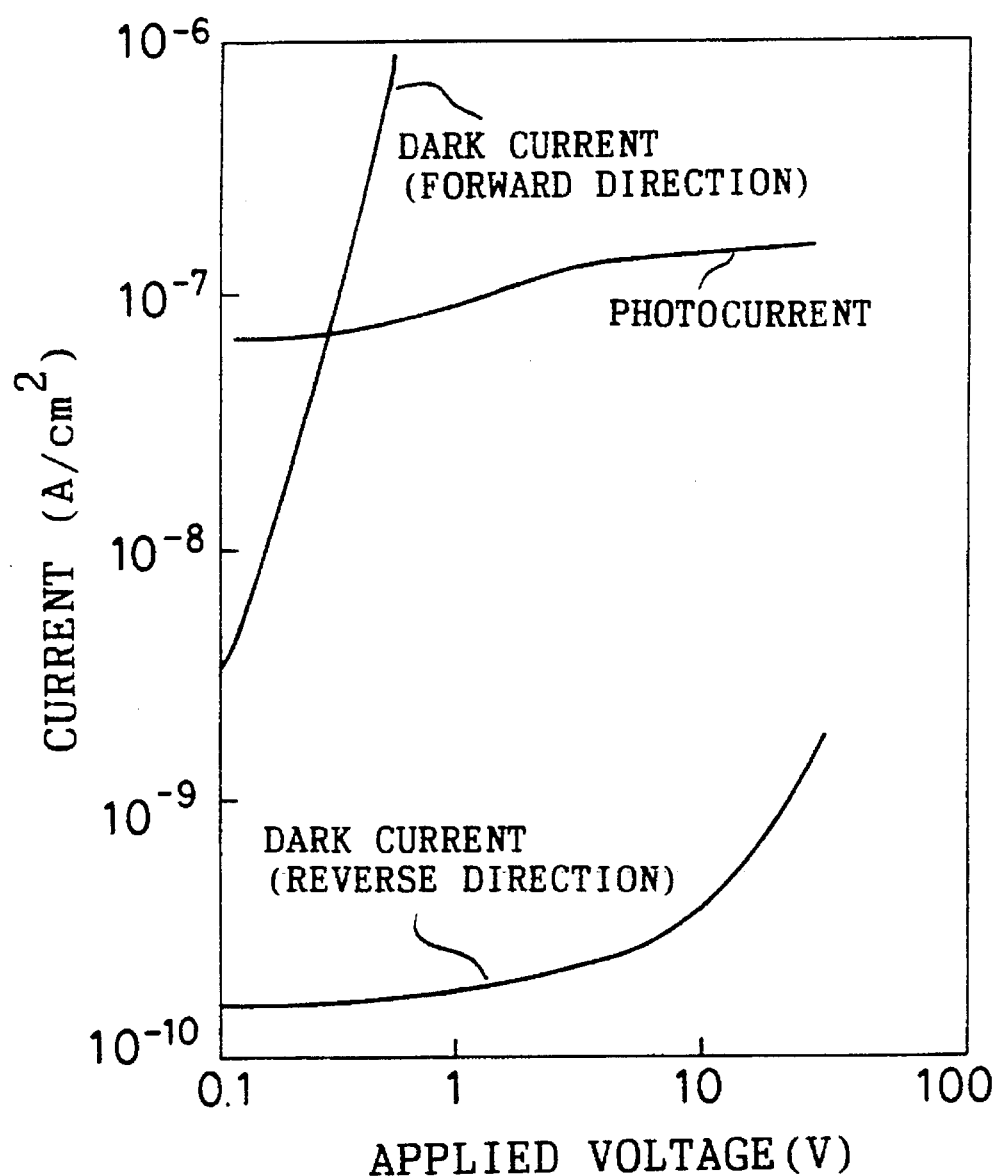
FIG. 6 is a graph showing a voltage/current characteristic in a photoconductive layer of one preferred embodiment.

The voltage/current characteristic of the used photoconductive layer 105 was examined using a device which was produced by similarly forming photoconductive layer 105 on ITO electrode and forming smaller-refractive-index a-Ge$_{1-x}$N$_x$:H layer 103 on AL electrode. FIG. 6 shows the results, confirming satisfactory photodiode properties. Photocurrent was provided by monochromatic radiation having a wavelength of 550 nm and an intensity of 0.5 μ/cm$^2$ from the side of ITO electrode 102.

Further, interference spectrum in the near-infrared region at 1000 to 2600 nm and IR spectrum of the a-Ge$_{1-x}$N$_x$:H film used in the device No. 1, which was deposited on a quartz plate and crystal Si wafer, was measured. Refractive indice provided from interference waveform at about 1500 nm were 2.0 to 2.9. These values were confirmed to be smaller than similarly measured indice of a-Si:H, 3.3 to 3.5. In IR spectrum, absorption peaks were observed at 3300 cm$^{-1}$ and 1150 cm$^{-1}$ which were due to N—H bonds. Further, absorption bands were conspicuously observed at 760 cm$^{-1}$ and 1430 cm$^{-1}$ which were due to Ge—N bonds.

EXAMPLE 2

As shown in FIG. 3, optical conductive layer 105 was similarly formed by ITO transparent electrode 102 on a glass substrate having a thickness of 0.05 to 0.2 μm by sputtering. On the photoconductive layer 105, island-shaped reflectors 301, which were 24 by 24 micrometers square, were formed by depositing a 500 nm thick Cr layer by vacuum deposition on the layer 105 and patterning the Cr layer by photolithographic technique to distribute 2000×2000 pieces of reflectors 301 in matrix keeping an interval of 2 μm each other. Such island-shaped reflectors can be formed by lift-off process, instead of photolithographic technique.

Figure 4A:
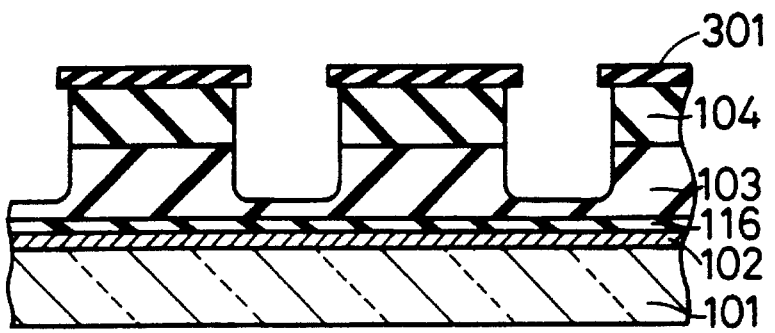
FIG. 4(a) to 4(c) are a sectional view of a spatial light modulator in forming processes of one preferred embodiment.
Figure 4B:
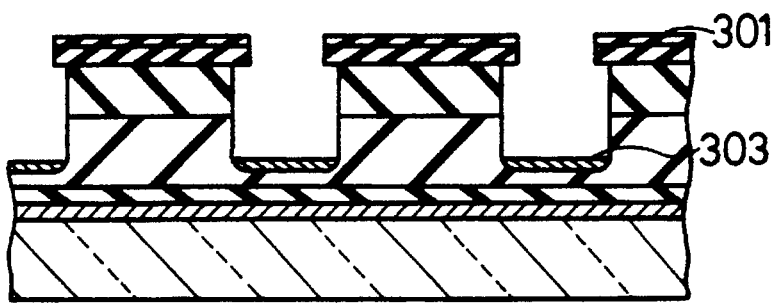

The a-Ge$_{1-x}$N$_x$:H layer 104 and the a-Si:H layer 103 between the reflectors 103 was removed by reactive ion etching (hereinafter abbreviated as RIE) or chemical dry etching (hereinafter abbreviated as CDE) using the reflectors 301 as masks. FIG. 4(a) is a sectional view of the photoconductive layer 105 at that time. Then, as shown in FIG. 4(b), a 100 nm thick Al was deposited by vacuum deposition on the reflectors 301 and on the bottom of grooves between the reflectors 301. The reflectors 301 came to have a bilayer structure of Al/Cr. The Al layers deposited on the bottom of the grooves became metal shielding layer 303 for shielding read light. Further, to form a polyimide insulating layer 304, a polyamic acid was applied to the grooves to form a layer having a thickness of 100 to 300 nm. These layers were preliminarily baked in air or nitrogen atmosphere at 90° to 100° C. for 5 min, and heat-treated at 200° to 300° C. for 30 to 60 min for rendering the layers to an imide. The polyamic acid used here was a copolymer of 3,3',4,4'-benzophenontetracarboxylic dianhydride and p-benzo(4,4'-aminothiophene) represented by Formula (2):

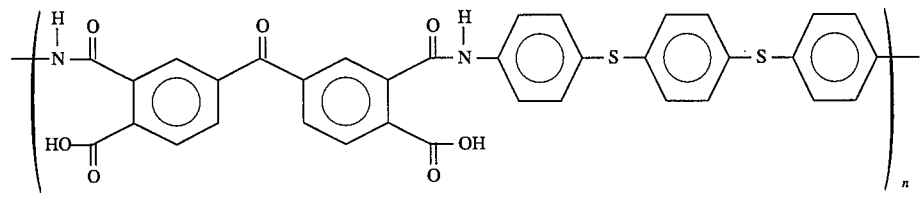

Formula (2)

Figure 4C:
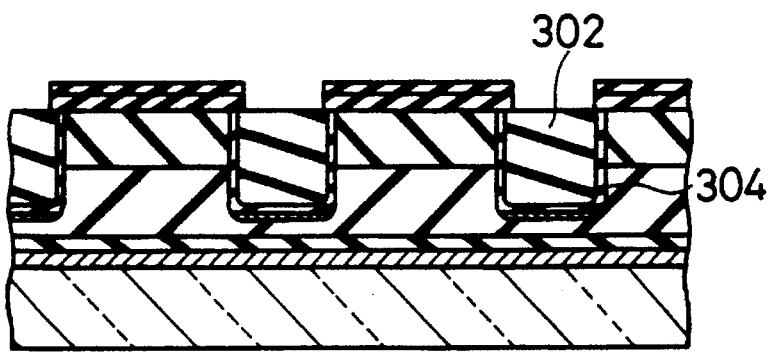

As shown in FIG. 4(c), a resist containing carbon particles was filled in the grooves, and preliminarily baked in air or nitrogen atmosphere at 90° to 100° C. for 5 min, and baked at 200° to 300° C. for 30 to 60 min to form photoabsorption layers 302. Further, the polyimide film and the resist remaining on the reflectors 301 were removed by CDE. The same polyamic acid was applied from above into a 10 to 30 nm thick layer, and preliminarily baked in air or nitrogen atmosphere at 90° to 100° C. for 5 min, heat-treated at 250° to 280° C. for 30 to 60 min, and processed by rubbing to form a polyimide aligned film. To complete spatial light modulator No. 3 shown in FIG. 3, FLC layer 107 having a thickness of 0.8 to 2 μm was sandwiched between this aligned film 108 and another polyimide aligned film 110 deposited with ITO transparent electrode 109 on a glass substrate 111.

The device was examined in a similar manner as in Example 1, and was found to exhibit a photosensitivity of 80 μW/cm$^2$ and a rise time of 30 μs.

EXAMPLE 3

As shown in FIG. 1, ITO transparent electrode 102 having a thickness of 0.05 to 0.2 μm was formed on glass substrate 101 by sputtering. This processed substrate was heated up to 250° to 300° C. in a plasma CVD device in FIG. 2, whose vacuum chamber 202 was evacuated to $1 \times 10^{-6}$ Torr. He-diluted $B_2H_6$ having a concentration of 100 ppm at a rate of 360 sccm, $SiH_4$ (1 sscm) and $C_2H_2$ (0.2 sccm) were altogether introduced to vacuum chamber 202 in which the pressure was then adjusted to 0.5 to 0.8 Torr. A high frequency power of 20 to 50 W having a frequency of 13.56 MHz was applied to electrode 203 to produce plasma for forming a p-type a-$Si_{1-x}C_x$:H layer where x was 0.23 having a thickness of 15 nm as smaller-refractive-index layer 116. He (150 to 300 sccm) and $SiH_4$ (0.75 to 6 sscm) were introduced to vacuum chamber 202 to similarly form an i-type undoped a-Si:H layer having a thickness of 1.2 to 2 μm as larger-refractive-index layer 103. After $N_2$ (100 to 200 sccm), $SiH_4$ (0.1 to 3 sccm) and $GeH_4$ (0.1 to 0.5 sccm) were introduced to vacuum chamber 202, smaller-refractive-index layer 104 was formed from an undoped a-$Si_{1-x-y}Ge_x$-$N_x$:H layer having a thickness of 0.1 to 0.9 μm ($0.1 \leq x \leq 0.5$, $0.1 \leq y \leq 0.4$) using a high frequency power of 10 to 30 W to complete photoconductive layer 105. On the photoconductive layer 105, layered dielectric reflector 106 was formed by alternately depositing Si and $SiO_2$ in sputtering method, and polyimide aligned film 108, which was aligned by rubbing, was layered thereon. Ferroelectric crystal layer 107 having a thickness of 0.8 to 1.3 μm was put between polyimide aligned film 108 and glass substrate 111 on which ITO transparent conductive electrode 109 and another polyimide aligned film 110 were layered. A spatial light modulator No. 4 was thus completed.

Figure 7:
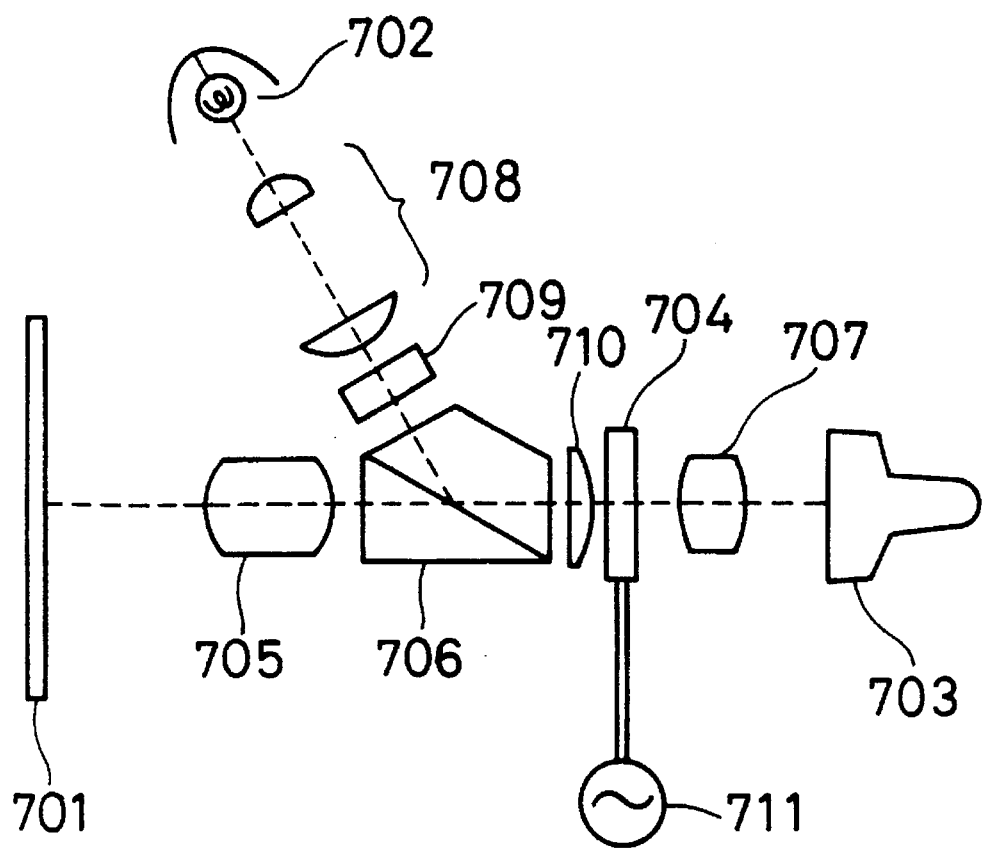
FIG. 7 is a schematic illustration of a projection-type display of one preferred embodiment.

FIG. 7 is a view of a projection-type display equipped with the above spatial light modulator of the preferred embodiment. The display includes screen 701 having a white spreading surface; projection light source 702 of metal halide lamp; CRT 703; spatial light modulator 704; projection lens 705 for magnifying an output image from the modulator by a factor of 40 on the screen; a polarization beam spritter 706; imagery lens 707 for producing images on photoconductive layer in the modulator from images displayed on CRT; relay lens 708; prepolarizer 709; auxiliary lens 710; and AC power source 711 for driving the modulator.

The formation and elimination of projected images, and projected results on the screen will briefly be explained.

An AC voltage waveform as shown in FIG. 5 ($V_p=15$ V, $V_n=-1$ V, Tp:T=1:11, and T=1 to 16 (ms)) was applied to each of transparent conductive electrodes 102 and 109. The polarization of the applied voltage was set so that the electrode 102 was negative. While a voltage of $V_n$ was applied to reversely bias the photoconductive layer 105, images being displayed on CRT 703 was written to the modulator 705, and the written images were projected on the screen 701. While a voltage of $V_p$ was applied, the photoconductive layer 105 was forward biased, and written images were erased. The illumination over the modulator 705 was 2,000,000 lx when metal halide lamp 702 was turned on. On the other hand, the contrast of the resulting images on the screen 701 was 150:1, and the resolution was 900 TV lines. The size of the image display region of CRT 703 used was an opposite angle of 6.2 inches (aspect ratio 16.9), the size of the photoconductive layer 105 receiving images was an opposite angle of 2.8 inches. The light emitting spectrum was a half value width of 50 nm at a center wavelength of 525 nm.

With the system shown in FIG. 7, the change of projected images with respect to light emitting wavelengths was observed by writing images using CRT 703 containing various kinds of fluorescent substances. The observation turned out that beam current of CRT 703 could be small as long as light of the fluorescent substances used in CRT 703 ranged from 400 to 600 nm. High resolution and high contrast and projected images free of afterimages or burning were also provided. The intensity of emitting light peaks at a wavelength of 400 to 600 nm. When the wavelength is more than 370 nm and less than 630 nm, the intensity becomes a half of the maximum. When the light emitting region of the fluorescence is a wavelength of 400 nm or less, absorption in the transparent electrode 102 is too large to neglect. The necessary beam current of CRT 703 for writing images has to be large, and therefore contrast and resolution of the images to display on CRT 703 are inappropriately lowered. On the contrary, absorption in the photoconductive layer 105 is large at 600 nm or less. Holes strongly affect the photocurrent running to the photoconductive layer 105. The holes in a-Si:H move slower than electrons, and have a deep trap. Accordingly, response of photocurrent running to the photoconductive layer 105 becomes slow, and projected images become dark, producing afterimages and burning. When the damping coefficient of the fluorescence in the fluorescent substance for use in CRT 703 is shorter than period T of a voltage waveform (FIG. 5) for driving the spatial light modulator 704, and is longer than T/10, images on CRT 703 are written in the modulator 704 most efficiently. The coefficient is the period of time during which the peaked intensity becomes one-tenth.

In the projection-type device in FIG. 7, CRT 703 were used for providing writing images. Instead of CRT, a display which outputs images with respect to light having a wavelength of 400 to 600 nm can be used. Examples of such a display include a liquid crystal display, a plasma display, an electric field light emitting device, a light emitting diode array, a semiconductor laser capable of working as a two dimensional scanner.

EXAMPLE 4

Spatial light modulators were produced by changing only the thickness of p-type a-$Si_{1-x}C_x$:H layer where x was 0.23 as smaller refractive-index layer 116 between 1.0 and 300 nm in spatial light modulator No. 4 formed in Example 3. Using the projection-type display equipped with these modulators as in FIG. 7, output images were similarly examined. It was turned out that the best resolution and contrast were provided when p-type a-$Si_{1-x}C_x$:H layer 116 had a thickness of 1.0 to 100 nm. Once the thickness was above 100 nm, the resolution and contrast decreased, giving afterimages and the burning. The reason for the decrease in the resolution and contrast was that light absorption decreased with increasing thickness of p-type a-$Si_{1-x}C_x$:H layer 116, and the amount of light arriving at i-type a-Si:H layer 103, increasing beam current to CRT 703. The reason for afterimages and the burning was that the increase in the thickness of p-type a-$Si_{1-x}C_x$:H layer 116 led to the increase in number of carriers which was captured by trapping in the layer 116. The thickness of the layer 116 having a thickness of 5.0 to 18 nm provided the best image quality.

EXAMPLE 5

Spatial light modulators were produced by changing only the carbon content x in p-type a-$Si_{1-x}C_x$:H smaller-refractive-index layer 116 between 0 and 0.8 in spatial light modulator No. 4 formed in Example 3. Output images were similarly examined using the projection-type display equipped with the modulators shown in FIG. 7. The best resolution and contrast were provided when the carbon content x is between 0.1 and 0.4. Once the content was above 0.4, afterimages and burning were observed. It seems because the increase in the carbon content was followed by the rapid increase in the density of trapped carriers in the layer 116. On the contrary, the resolution and contrast were considerably deteriorated when the carbon content was below 0.1. That was because increase in light absorption due to the decrease in band gap of the layer 116 increased the beam current of CRT 703.

The projected images were similarly examined using the projection-type display equipped with these modulators as shown in FIG. 7 with the size of CRT 703 changed. It turned out that the best resolution and contrast were provided when x of p-type a-$Si_{1-x}C_x$:H layer 116 ranges from 0.1 to 0.4 the display region of CRT 703 has the opposite angle o 2.5 inches or more with respect to a spatial light modulator where the photoconductive layer 105 has the opposite angle of 2.8 inches. When p-type a-$Si_{1-x}C_x$:H where x is zero, that is p-type a-Si:H, was used, no CRT other than CRT having the opposite angle of 8 inches or more provided satisfactory images. The light emitting spectrum of CRT 703 was a half value width of 50 nm at a center wavelength of 525 nm.

EXAMPLE 6

When the spatial light modulators Nos. 1 and 2 produced in Examples 1 and 2 were each set in the projection-type display of FIG. 7, images projected on CRT 703 after expansion were projected on screen 701 with high resolution.

EXAMPLE 7

Figure 8:
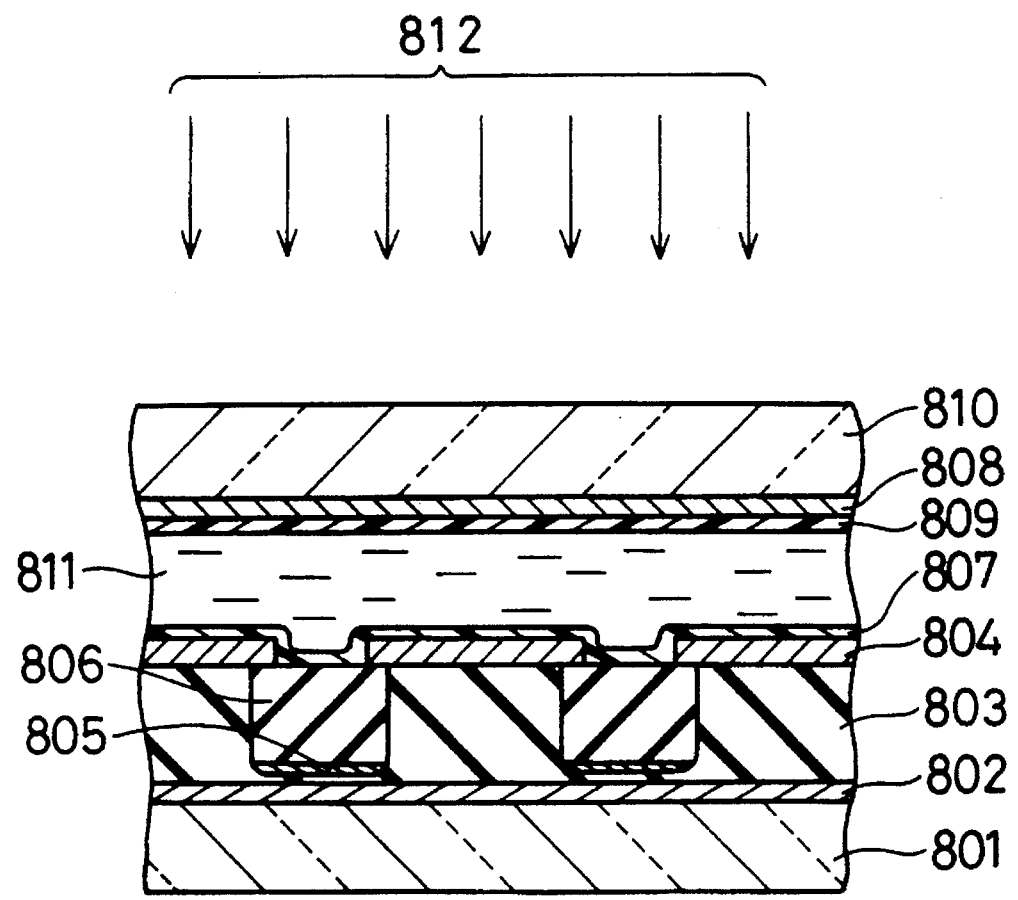
FIG. 8 is a sectional view of the spatial light modulator of Examples 7 and 13.

FIG. 8 is a sectional view of the spatial light modulator produced in this embodiment. As shown in FIG. 8, an ITO film having a thickness of 0.05 to 0.2 μm as transparent electrode 802 was formed on glass substrate 801 by sputtering. These film and electrode were set in a plasma CVD apparatus shown in FIG. 2. Vacuum chamber 202 was evacuated to $1\times10^{-6}$ Tort or less, and heated by heater 214 up to 150° C. for 10 min. Differences in temperatures, maximumly ±20° C., were caused in the surface of the substrate due to such a short heating time. He-diluted $B_2H_6$ having a concentration of 10 ppm at a rate of 200 sccm, and $SiH_4$ (40 sscm) were all introduced together to vacuum chamber 202 in which the pressure was then adjusted to 0.8 Tort. A high frequency power (15 W) having a frequency of 13.56 MHz was applied to electrode 203 to produce discharge for forming a 10.0 nm thick p-type a-$Si_{1-x}C_x$:H layer. After vacuum chamber 202 was highly evacuated, $H_2$ (100 sccm) and $SiH_4$ (40 sscm) were introduced thereto. An i-type undoped a-Si:H layer having a thickness of 1.0 to 1.8 μm was similarly formed under 0.8 Torr at a radiofrequency-power of 15 W. Afterwards, vacuum chamber 202 was evacuated once again. He-diluted $PH_3$ having a concentration of 100 ppm at a rate of 200 sccm and $SiH_4$ (40 sscm) were introduced to vacuum chamber 202. A high frequency power (15 W) was applied under 0.8 Torr to form n-type a-Si:H as photoconductive layer 803 having a thickness of 0.05 to 0.3 μm. The substrate was cooled down to room temperature by water cooling using a cooler 217 for about 10 min. At this time, the films did not peel off. With the photoconductive layer 105 in Examples 1, 2 and 3, it took 60 min to heat or cool down the substrate. On the other hand, the substrate was processed in only 10 min for heating or cooling, respectively. A 500 nm thick film of Cr was deposited on photoconductive layer 803 by vacuum deposition and patterned by photolithographic technique to form island-shaped reflectors 804. They were 24 by 24 micrometers square, distributing as 2000×2000 pieces keeping an interval of 2 μm each other in matrix.

The n-type a-Si:H layer and the i-type a-Si:H layer between the island-shaped reflectors 804 were removed by RIE or CDE. A 50 nm thick Al film was deposited by vacuum deposition from above on the reflectors 804 and on the bottom of grooves. The reflectors 804 came to have a bilayer structure of Al/Cr. The Al layers deposited on the bottom of the grooves became metal shielding film 805 for shielding read light 812. Resist containing carbon particles was filled in the grooves, and preliminarily baked in air or nitrogen atmosphere at 90° to 100° C. for 5 min, and baked at 200° to 300° C. for 30 to 60 min to form light absorption layers 806. Further, the resist remaining on the island-shaped reflectors 804 were removed by CDE. The polyamic acid was applied from above into a 10 to 30 nm thick layer, and preliminarily baked in air or nitrogen atmosphere at a temperature of 90° to 100° C. for 5 min, heat-treated for preparing an imide at 250° to 280° C. for 30 to 60 min, and processed by rubbing to form a polyimide aligned film 807. Between this aligned film 807 and another polyimide aligned film 809 deposited with ITO transparent electrode 808 on a glass substrate 810, FLC layer 811 having a thickness of 0.8 to 2 μm was sandwiched to complete a spatial light modulator.

The modulator was examined in the similar projection condition as in Example 3, and it was found that projected images exhibited high resolution and high contrast, free of unevenness.

These results confirmed that photoconductivity and uniformity in images are improved, depending on the heat treatment in processing a device, even if the substrate temperature was low in forming photoconductive layer 803, and the temperature is not constant.

When temperatures for preparing an imide from polyimide oriented film 807 and treatment temperatures for heating light absorption layer 806 were set above 300° C., the period of time treating was shorten to about 10 min. However, the photoconductive layer 803 was dotted due to peeling-off so that a satisfactory device was not produced.

EXAMPLE 8

Spatial light modulators (1) through (5) were produced in the same manner as in Example 7, except for changing only the heating temperature $T_i$ for polyimide aligned film 807 and photoconductive layer 806. Using the projection-type display equipped with these modulators as shown in FIG. 7, output images projected on screen 701 were similarly examined. Table 1 shows the results of examination. The symbol $T_i$ means heating temperature for polyimide aligned film 807 and photoconductive layer 806.

TABLE 1

| Sample No. | Heat Treatment Temp. $T_i$ (°C.) | Quality of Output Image | | | | Sensitivity of Device |
| --- | --- | --- | --- | --- | --- | --- |
| | | Contrast | Resolution | Uniformity | Brightness | |
| (1) | 150 | × | ○ | × | × | × |
| (2) | 180 | Δ | ○ | Δ | Δ | Δ |
| (3) | 200 | ○ | ○ | ○ | ○ | ○ |
| (4) | 250 | ◎ | ◎ | ◎ | ◎ | ◎ |
| (5) | 300 | ◎ | ◎ | ◎ | ◎ | ◎ |

(◎: Excellent ○: Good Δ: Fair ×: Unsatisfactory)

EXAMPLE 9

Spatial light modulators (6) through (11) were produced in the same manner as in Example 7, except for changing only the substrate temperature $T_s$ in forming photoconductive layer 803. The period of time for heating was set 10 min. When a temperature was below room temperature (10° C.), the temperature was adjusted constant by repetition of cooling and heating using liquid nitrogen. Using the projection-type display equipped with the modulators shown in FIG. 7, output images projected on screen were similarly examined. Table 2 shows the results of examination.

TABLE 2

| Sample No. | Heat Treatment Temp. $T_s$ (°C.) | Quality of Output Image | | | | Sensitivity of Device |
| --- | --- | --- | --- | --- | --- | --- |
| | | Contrast | Resolution | Uniformity | Brightness | |
| (6) | −10 | Δ | ○ | ○ | Δ | Δ |
| (7) | 10 | ○ | ○ | ◎ | ○ | ○ |
| (8) | 100 | ◎ | ◎ | ◎ | ○ | ◎ |
| (9) | 180 | ◎ | ◎ | ○ | ◎ | ◎ |
| (10) | 200 | ◎ | ◎ | Δ | ◎ | ◎ |
| (11) | 220 | ◎ | ◎ | × | ◎ | ◎ |

(◎: Excellent ○: Good Δ: Fair ×: Unsatisfactory)

EXAMPLE 10

Figure 9:
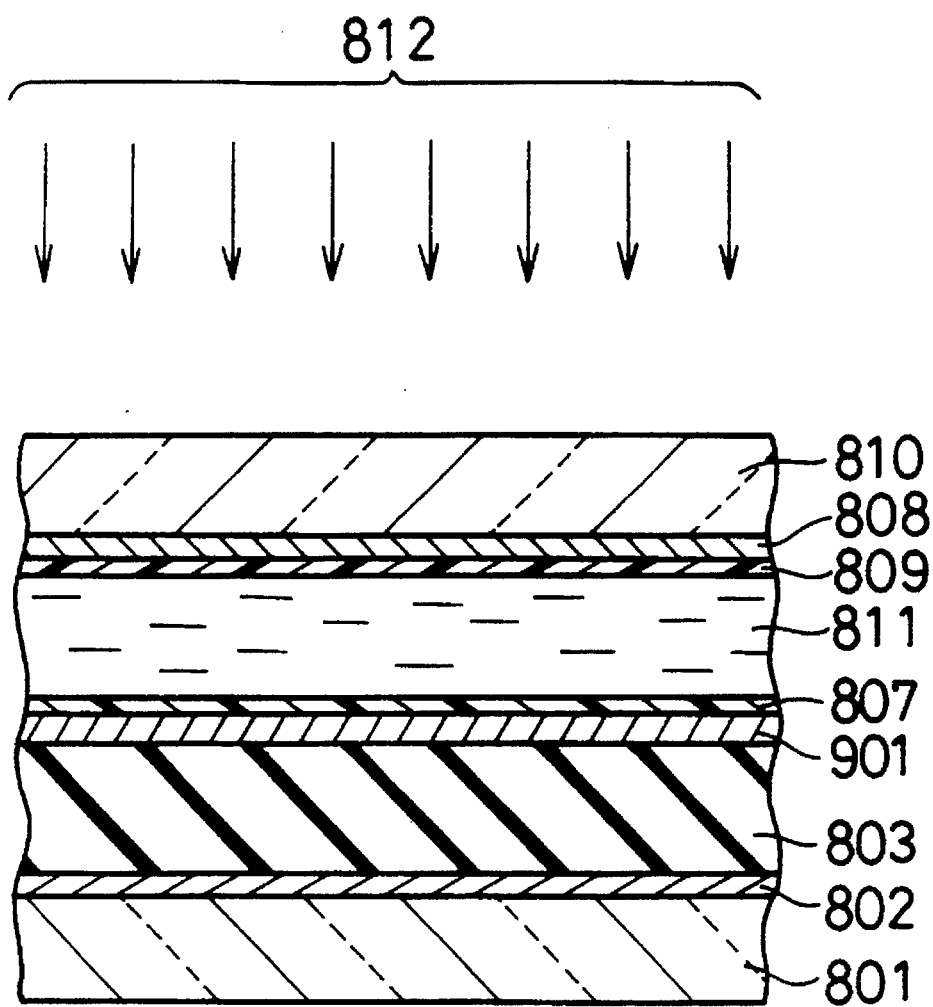
FIG. 9 is a sectional view of a spatial light modulator of Example 16.
Figure 10:
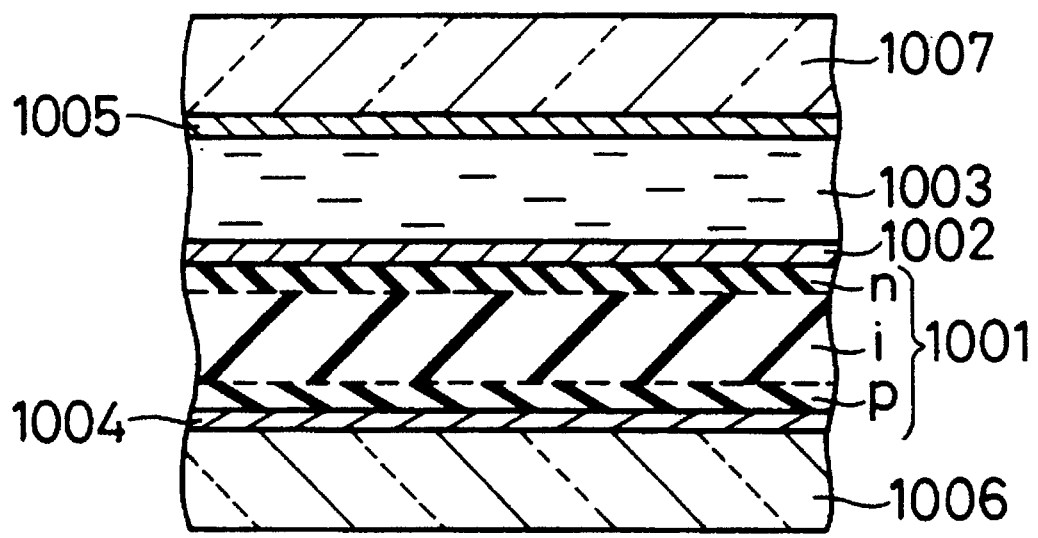
FIG. 10 is a sectional view of a conventional spatial light modulator.

FIG. 9 is a sectional view of a spatial light modulator produced in this embodiment.

Photoconductive layer 803 was formed on an ITO electrode 802 in the same manner as in Example 7. The layer 803, electrode 802 and substrate 801 were set in a high frequency sputtering apparatus. A 0.6 µm thick dielectric reflector 901 was formed by alternately depositing five layers of $SiO_2$ and Si in the thickness of 120 nm under 2 to 10 Torr using silicon as a target with the substrate heated at 250° to 280° C. At this time, a mixed gas of Ar and $O_2$ was introduced to the apparatus in forming an $SiO_2$ layer, and only Ar was in turn introduced in forming an Si layer. On the dielectric reflector 901, 100 nm thick SiO aligned film 807 was formed by oblique deposition. Ferroelectric crystal layer 811 having a thickness of 1 to 2 µm was put and sealed between aligned film 807 and glass substrate 111 on which ITO transparent conductive electrode 808 and another SiO oriented film 809 were layered. A spatial light modulator was thus completed.

Using the device shown in FIG. 7, which is equipped with the above modulator, images were projected on screen 701 according to written images displayed on CRT 703 in a similar manner as in Example 7. The projected images were free of irregularity. However, the contrast was reduced to 10:1 because light shielding was incomplete in the same condition as in Example 7. To maintain a contrast of 150:1, the brightness above the modulator 705 had to be 500,000 1× when metal halide lamp 702 was turned on. The brightness of the projected images was satisfactory with a magnification of 20.

EXAMPLE 11

Spatial light modulators (12) through (16) were produced in the same manner as in Example 10, except for changing only substrate temperature $T_d$ in forming dielectric reflector 901. With the projection-type display equipped with the modulator shown in FIG. 7, output images projected on screen 701 were similarly examined. Table 3 shows the results of examination.

TABLE 3

| Sample No. | Reflector Forming Temp. $T_d$ (°C.) | Quality of Output Image | | | | Sensitivity of Device |
| --- | --- | --- | --- | --- | --- | --- |
| | | Contrast | Resolution | Uniformity | Brightness | |
| (12) | 150 | × | ○ | × | × | × |
| (13) | 180 | Δ | ○ | Δ | Δ | Δ |
| (14) | 200 | ○ | ○ | ○ | ○ | ○ |
| (15) | 250 | ○ | ◎ | ◎ | ○ | ◎ |
| (16) | 300 | ○ | ◎ | ◎ | ○ | ◎ |

(◎: Excellent ○: Good Δ: Fair ×: Unsatisfactory)

EXAMPLE 12

Spatial light modulators (17) through (22) were produced in the same manner as in Example 10, except for changing only substrate temperature $T_s$ in forming photoconductive layer 803, the period of time for heating was set 10 min. In the case of a temperature below room temperature (10° C.), the temperature was adjusted constant by repetition of cooling and heating using liquid nitrogen. With the projection-type display equipped with the modulator shown in FIG. 7, output images projected on screen were similarly examined. Table 4 shows the results of this examination.

TABLE 4

| Sample No. | Substrate Temp. $T_s$ (°C.) | Quality of Output Image | | | | Sensitivity of Device |
| --- | --- | --- | --- | --- | --- | --- |
| | | Contrast | Resolution | Uniformity | Brightness | |
| (17) | −10 | Δ | ○ | ○ | Δ | Δ |
| (18) | 10 | ○ | ○ | ◎ | ○ | ○ |
| (19) | 100 | ○ | ◎ | ◎ | ○ | ◎ |
| (20) | 180 | ○ | ◎ | ○ | ○ | ◎ |
| (21) | 200 | ○ | ◎ | Δ | ○ | ◎ |
| (22) | 220 | ○ | ◎ | × | ○ | ◎ |

(◎: Excellent ○: Good Δ: Fair ×: Unsatisfactory)

EXAMPLE 13

FIG. 8 is a sectional view of a spatial light modulator produced in this embodiment.

On glass substrate 801, ITO electrode 802 was formed, and p-type a-$Si_{1-x}C_x$:H film and i-type a-Si:H film were deposited in the same manner as in Example 7. Further, n-type a-Si:H film was deposited to complete photoconductive layer 803. The substrate temperature in forming p-type a-$Si_{1-x}C_x$:H film was set at 300° C. and the substrate temperature in forming i-type a-Si:H film was set from 250° to 180° C., the substrate temperature in forming n-type a-Si:H film was set from 180° to 150° C. Before forming photoconductive layer 803, the period of time for heating was 60 min. After forming the layer 803, the period of time for water-cooling was only 10 min. On photoconductive layer 803 thus formed, a 300 nm thick Cr layer was deposited by vacuum deposition and patterned by photolithographic technique to form island-shaped reflectors 804. They were 24 by 24 micrometers square, distributing as 2000×2000 pieces keeping an interval of 2 μm each other in matrix.

The photoconductive layer 803 between the island-shaped reflectors 804 was removed by RIE. From above, a 50 nm thick Al film was deposited by vacuum deposition on the reflectors 804 and on the bottom of grooves. The reflectors 804 came to have a bilayer structure of Al/Cr. The Al layers deposited on the bottom of the grooves became metal shielding film 805 for shielding read light 812. Resist containing carbon particles was filled in the grooves, and preliminarily baked in air or nitrogen atmosphere at 90° to 100° C. for 5 min, and baked at 250° to 280° C. for 30 min to form light absorption layers 806. Further, the resist film remaining on the island-shaped reflectors 804 were removed by CDE. The polyamic acid was applied from above into a 10 to 30 nm thick layer, and preliminarily baked in air or nitrogen atmosphere at 90° to 100° C. for 5 min, heat-treated for preparing an imide at 250° to 280° C. for 60 min, and processed by rubbing to form a polyimide aligned film 807. Between this aligned film 807 and another polyimide aligned film 809 deposited with ITO transparent electrode 808 on a glass substrate 810, FLC layer 811 having a thickness of 1 to 2 μm was sandwiched and sealed to complete a spatial light modulator.

Using a similar device as shown in FIG. 7, in which the modulator was installed, images were reproduced on screen 701 according to written images displayed on CRT 703. The reproduced images were free of unevenness.

EXAMPLE 14

Spatial light modulators (23) through (27) were produced in the same manner as in Example 13, except for changing only the heating temperature $T_i$ for polyimide aligned film 807 and photoconductive layer 806. Output images projected on screen 701 were similarly examined using the projection-type display equipped with the modulator shown in FIG. 7. Table 5 shows the results of this examination.

TABLE 5

| Sample No. | Heat Treatment Temp. $T_i$ (°C.) | Quality of Output Image | | | | Sensitivity of Device |
|---|---|---|---|---|---|---|
| | | Contrast | Resolution | Uniformity | Brightness | |
| (23) | 150 | × | ○ | × | × | × |
| (24) | 180 | Δ | ⊚ | ○ | Δ | Δ |
| (25) | 200 | ○ | ⊚ | ⊚ | ○ | ○ |
| (26) | 250 | ○ | ⊚ | ⊚ | ○ | ⊚ |
| (27) | 300 | ○ | ⊚ | ⊚ | ○ | ⊚ |

(⊚: Excellent ○: Good Δ: Fair ×: Unsatisfactory)

EXAMPLE 15

Spatial light modulators (28) through (33) were produced in the same manner as in Example 13, except for setting the substrate temperature at 300° C. in forming p-type a-Si$_{1-x}$C$_x$:H film and changing only the substrate temperature $T_f$ after forming photoconductive layer 803. Output images projected on screen 701 were similarly examined using the device equipped with the modulator shown in FIG. 7. Table 6 shows the results of this examination.

TABLE 6

| Sample No. | Formation Finishing Temp. $T_f$ (°C.) | Quality of Output Image | | | | Sensitivity of Device |
|---|---|---|---|---|---|---|
| | | Contrast | Resolution | Uniformity | Brightness | |
| (28) | 250 | ○ | ○ | × | ○ | ⊚ |
| (29) | 200 | ○ | ○ | × | ○ | ⊚ |
| (30) | 180 | ○ | ⊚ | ○ | ○ | ⊚ |
| (31) | 130 | ○ | ⊚ | ⊚ | ○ | ⊚ |
| (32) | 80 | ○ | ⊚ | ⊚ | ○ | ⊚ |
| (33) | 10 | ○ | ⊚ | ⊚ | ○ | ⊚ |

(⊚: Excellent ○: Good Δ: Fair ×: Unsatisfactory)

EXAMPLE 16

FIG. 9 is a sectional view of a spatial light modulator produced in this embodiment.

On glass substrate 801, ITO electrode 802 was formed, and p-type a-Si$_{1-x}$C$_x$:H film and i-type a-Si:H film were deposited in the same manner as in Example 10. Further, n-type a-Si:H film was deposited to complete photoconductive layer 803. The substrate temperature in forming p-type a-Si$_{1-x}$C$_x$:H film was set at 300° C., and the substrate temperature in forming i-type a-Si:H film was set from 250° to 180° C., the substrate temperature in forming n-type a-Si:H film was set from 180° to 150° C.

Before forming photoconductive layer 803, the period of time for heating was 60 min. After forming the layer 803, the period of time for water-cooling was only 10 min. The substrate 801 was set in a high frequency sputtering apparatus. A 0.6 μm thick dielectric reflector 901 was formed by alternately depositing five layers of SiO$_2$ and Si in the thickness of 120 nm under 2 to 10 Torr using silicon as a target with the substrate heated at 250° to 280° C. At this time, a mixed gas of Ar and O$_2$ was introduced to the apparatus in forming an SiO$_2$ layer, and only Ar was in turn introduced in forming an Si layer. On the dielectric reflector 901, 100 nm thick SiO aligned film 807 was formed by oblique deposition. Ferroelectric crystal layer 811 having a thickness of 1 to 2 μm was put and sealed between oriented film 807 and glass substrate 111 on which ITO transparent conductive electrode 808 and another SiO$_x$ aligned film 809 were layered. A spatial light modulator was thus completed.

Images were projected on screen 701 in a similar manner as in Example 10 using a device equipped with the above modulator as shown in FIG. 7. The projected images were free of irregularity.

EXAMPLE 17

Spatial light modulators (34) through (38) were produced in the same manner as in Example 16, except for changing only substrate temperature to $T_d$ in forming dielectric reflector 901. The output images projected on screen 701 were similarly examined using the device equipped with the modulator shown in FIG. 7. Table 7 shows the results of this examination.

TABLE 7

| Sample No. | Reflector Forming Temp. $T_d$ (°C.) | Quality of Output Image | | | | Sensitivity of Device |
|---|---|---|---|---|---|---|
| | | Contrast | Resolution | Uniformity | Brightness | |
| (34) | 150 | × | ○ | × | × | × |
| (35) | 180 | △ | ○ | △ | △ | ○ |
| (36) | 200 | ○ | ○ | ○ | ○ | ○ |
| (37) | 250 | ○ | ⊙ | ⊙ | ○ | ⊙ |
| (38) | 300 | ○ | ⊙ | ⊙ | ○ | ⊙ |

(⊙: Excellent ○: Good △: Fair ×: Unsatisfactory)

EXAMPLE 18

Spatial light modulators (39) through (44) were produced in the same manner as in Example 16, except for setting the substrate temperature at 300° C. in forming p-type a-$Si_{1-x}C_x$:H film and changing only substrate temperature $T_f$ after forming photoconductive layer 803. The output images projected on screen 701 were similarly examined using the device equipped with these modulators in FIG. 7. Table 8 shows the results of examination.

TABLE 8

| Sample No. | Formation Finishing Temp. $T_f$ (°C.) | Quality of Output Image | | | | Sensitivity of Device |
|---|---|---|---|---|---|---|
| | | Contrast | Resolution | Uniformity | Brightness | |
| (39) | 250 | ○ | ○ | × | ○ | ⊙ |
| (40) | 200 | ○ | ○ | × | ○ | ⊙ |
| (41) | 180 | ○ | ⊙ | ○ | ○ | ⊙ |
| (42) | 130 | ○ | ⊙ | ⊙ | ○ | ⊙ |
| (43) | 80 | ○ | ⊙ | ⊙ | ○ | ⊙ |
| (44) | 10 | ○ | ⊙ | ⊙ | ○ | ⊙ |

(⊙: Excellent ○: Good △: Fair ×: Unsatisfactory)

All the modulators produced in the above Examples worked as a spatial light modulator to display dynamic holograms.

Color images can be output on a screen using the projection system shown in FIG. 7 by combining three CRTs for displaying three colors of red, green and blue and three spatial light modulators and incorporating a color separation optical system and color synthetic optical system in a reading-out optical system.

As described above, with the spatial light modulator of the invention, write light is reflected at the interface between the larger-refractive-index layer and the smaller-refractive-index layer. The write light is reflected into i layer having a depletion layer when the larger-refractive-index layer is formed of, for example, i-type a-Si:H. Reflected light is absorbed in the i layer to generate photocarriers. The photocarriers are applied with a high electric field by the depletion layer of the i layer. They drift in accordance with the electric field, and they work as a photocurrent for running in a photoconductive layer. The reflected light has a shorter optical path length than that of light reflected at photoreflective layer in conventional cases. Therefore, the spatial light modulator exhibits high resolution and high sensitivity.

The method of producing a spatial light modulator of the invention needs little time for heating or cooling photoconductive layer and are free from film-peeling and much stress. Therefore, the method enables mass-production of spatial light modulators.

The projection-type display of the invention reduces absorption of light in a p layer, and the display is used to write even a short wave light. The display also outputs images free of afterimages or burning and enables to operate with a small CRT. Therefore, the projector can be downsized.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A spatial light modulator comprising a pair of transparent insulating substrates each having a transparent conducting electrode, said substrates forming a top layer and a bottom layer, a photoconductive layer, a liquid crystal layer and a reflection layer being present between said top and bottom layers, wherein said photoconductive layer comprises a first amorphous semiconductor layer and a second amorphous semiconductor layer deposited in order on said bottom layer, wherein said first amorphous semiconductor layer and said second amorphous semiconductor layer have different refractive indices from each other;

said first amorphous semiconductor layer has a refractive index between 3.2 and 4.7 and said second amorphous semiconductor layer has a refractive index between 1.4 and 3.2; and the compositions of said first amorphous semiconductor layer and said second amorphous semiconductor layer are different with respect to at least one element.

2. The spatial light modulator according to claim 1, wherein said photoconductive layer further comprises a third amorphous semiconductor layer between said transparent conducting electrode of the bottom layer and said first amorphous semiconductor layer, and said third amorphous semiconductor layer has a refractive index smaller than the first amorphous semiconductor layer.

3. The spatial light modulator according to claim 2, wherein said third amorphous semiconductor layer comprises at least one p-type dopant selected from the group consisting of B, Al and Ga.

4. The spatial light modulator according to claim 2, wherein the third amorphous semiconductor layer has a thickness of 1 to 300 nm.

5. The spatial light modulator according to claim 2, wherein the third amorphous semiconductor layer comprises silicon carbide containing 100 to 10000 ppm of at least one p-type dopant selected from the group consisting of B, Al, Ga and In.

6. The spatial light modulator according to claim 1, wherein said photoconductive layer has rectification.

7. The spatial light modulator according to claim 1, wherein said first amorphous semiconductor layer comprises an alloy containing silicon as a main ingredient.

8. The spatial light modulator according to claim 7, wherein said first amorphous semiconductor layer comprises at least one element selected from the group consisting of hydrogen, a halogen and oxygen.

9. The spatial light modulator according to claim 1, wherein said first amorphous semiconductor layer comprises at least one alloy selected from the group consisting of hydrogenated amorphous silicon, hydrogenated amorphous germanium, hydrogenated amorphous-silicon germanium and hydrogenated amorphous-germanium carbide.

10. The spatial light modulator according to claim 1, wherein the second amorphous semiconductor layer comprises an alloy containing germanium as a main ingredient.

11. The spatial light modulator according to claim 1, wherein the second amorphous semiconductor layer comprises at least one alloy selected from the group consisting of hydrogenated amorphous silicon, hydrogenated amorphous germanium nitride, hydrogenated amorphous-silicon germanium nitride, hydrogenated amorphous-silicon carbide, hydrogenated amorphous silicon nitride, hydrogenated amorphous-silicon oxide and hydrogenated amorphous carbon.

12. The spatial light modulator according to claim 11, wherein said second amorphous semiconductor layer comprises at least one n-type dopant selected from the group consisting of P, As, Sb and Se.

13. The spatial light modulator according to claim 11, wherein the second amorphous semiconductor layer comprising hydrogenated amorphous-silicon carbide has a carbon content of 10 to 40 atom %.

14. The spatial light modulator according to claim 1, a wavelength of 400 to 600 nm.

15. The spatial light modulator according to claim 1, wherein said reflection layer comprises at least one metal selected from the group consisting of Al, Ag, Mo, Ni, Cr, Mg and Ti.

16. The spatial light modulator according to claim 1, wherein said reflection layer is formed in islands, and one of said island-shaped reflection layers corresponds to one pixel.

17. The spatial light modulator according to claim 16, wherein at least a part of the photoconductive layer between two adjacent island-shaped reflection layers is removed, and an optical absorption layer is present in the space where the photoconductive layer was removed.

18. The spatial light modulator according to claim 12, wherein said optical absorption layer comprises at least one material selected from the group consisting of an organic polymer dispersed with carbon particle, an organic polymer containing black pigment, an organic polymer containing black dye, amorphous carbon, amorphous germanium and amorphous germanium nitride.

19. The spatial light modulator according to claim 17, wherein a light-shielding layer is present under said optical absorption layer, and said light-shielding layer comprises at least one metal selected from the group consisting of Al, Ag, Mo, Ni, Cr and Mg.

20. The spatial light modulator according to claim 17, wherein said optical absorption layer is coated with an electrically insulating layer selected from the group consisting of an inorganic insulating layer and an organic insulating layer.

21. A projection-type display comprising a spatial light modulator comprising a pair of transparent insulating substrates each having a transparent conducting electrode forming a top layer and a bottom layer, a photoconductive layer and a liquid crystal layer, an AC power source for outputting an AC voltage to drive said spatial light modulator, said power source being connected with said conducting electrode, an image input means comprising a cathode-ray-tube for outputting an image by light having a wavelength of 400 to 600 nm, an image forming means for forming an image from the image being output from said image input means on said photoconductive layer, and a light source and a projection lens for reading said image being output from said spatial light modulator, wherein said photoconductive layer comprises a first amorphous semiconductor layer containing silicon and carbon as main ingredients and a second amorphous semiconductor layer containing silicon as a main ingredient, said first and second layers being laminated in order between said top and bottom layers, and a decay time from 100% to 10% of emission intensity of said cathode-ray-tube is longer than 10% of the period of said AC voltage and shorter than the period of said AC voltage.

22. The projection-type display according to claim 21, wherein said first amorphous semiconductor layer has a thickness smaller than said second amorphous semiconductor layer.

23. The projection-type display according to claim 21, wherein said first amorphous semiconductor layer has a thickness of 8 to 18 nm.

24. A spatial light modulator comprising a pair of transparent insulating substrates each having a transparent conducting electrode, said substrates forming a top layer and a bottom layer, a photoconductive layer, a liquid crystal layer and a reflection layer being present between said top and bottom layers, wherein said reflection layer is formed in islands, at least one groove is formed in said photoconductive layer between two adjacent island-shaped reflection layers and is removed, the thickness of said photoconductive layer at said groove is less than 1 µm, and an optical absorption layer is present in the groove.

25. The spatial light modulator according to claim 24, wherein said optical absorption layer comprises at least one material selected from the group consisting of an organic polymer dispersed with carbon particle, an organic polymer containing black pigment, an organic polymer containing black dye, amorphous carbon, amorphous germanium and amorphous germanium nitride.

26. The spatial light modulator according to claim 24, wherein a light-shield layer is present under said optical absorption layer, and said light-shielding layer comprises at least one metal selected from the group consisting of Al, Ag, Mo, Ni, Cr and Mg.

27. The spatial light modulator according to claim 24, wherein said optical absorption layer is coated with an electrically insulating layer selected from the group consisting of an inorganic insulating layer and an organic insulating layer.

28. A spatial light modulator comprising a pair of transparent insulating substrates each having a transparent conducting electrode, said substrates forming a top layer and a bottom layer, a photoconductive layer, a liquid crystal layer and a reflection layer being present between said top and bottom layers, wherein said photoconductive layer comprises a first amorphous semiconductor layer and a second amorphous semiconductor layer deposited in order on said bottom layer, wherein said first amorphous semiconductor layer and said second amorphous semiconductor layer have different refractive indices from each other;

said first amorphous semiconductor layer has a refractive index between 3.2 and 4.7 and said second amorphous semiconductor layer has a refractive index between 1.4 and 3.2; and the composition of said first amorphous layer is the same as the composition of the second amorphous layer except that the ratio of the elements of the compositions differ between the first amorphous layer and the second amorphous layer.

* * * * *